(12) United States Patent
Shah et al.

(10) Patent No.: US 9,650,501 B2
(45) Date of Patent: May 16, 2017

(54) COMPOSITE MATERIALS FORMED BY SHEAR MIXING OF CARBON NANOSTRUCTURES AND RELATED METHODS

(71) Applicant: APPLIED NANOSTRUCTURED SOLUTIONS, LLC, Baltimore, MD (US)

(72) Inventors: Tushar K. Shah, Fulton, MD (US); Mark R. Alberding, Glen Arm, MD (US); Rajneeta R. Basantkumar, Edgewood, MD (US); Corey A. Fleischer, Abingdon, MD (US)

(73) Assignee: Applied Nanostructured Solutions, LLC, Baltimore, MD (US)

(*) Notice: Subject to any disclaimer, the term of this patent is extended or adjusted under 35 U.S.C. 154(b) by 0 days.

(21) Appl. No.: 15/245,081

(22) Filed: Aug. 23, 2016

(65) Prior Publication Data

US 2016/0362542 A1  Dec. 15, 2016

Related U.S. Application Data

(62) Division of application No. 14/040,529, filed on Sep. 27, 2013, now Pat. No. 9,447,259.

(60) Provisional application No. 61/707,738, filed on Sep. 28, 2012, provisional application No. 61/722,085, filed on Nov. 2, 2012.

(51) Int. Cl.
| | |
|---|---|
| *C08K 9/00* | (2006.01) |
| *C08K 9/04* | (2006.01) |
| *C08K 7/06* | (2006.01) |
| *C08J 3/20* | (2006.01) |
| *C08K 7/24* | (2006.01) |

(52) U.S. Cl.
CPC ............... *C08K 9/04* (2013.01); *C08J 3/203* (2013.01); *C08K 7/06* (2013.01); *C08K 7/24* (2013.01); *C08K 2201/011* (2013.01); *Y02P 20/582* (2015.11)

(58) Field of Classification Search
CPC ... C08K 9/04; C08K 7/06; C08K 7/24; C08K 2201/011; C08J 3/03
See application file for complete search history.

(56) References Cited

U.S. PATENT DOCUMENTS

| | | | | |
|---|---|---|---|---|
| 2006/0099135 A1* | 5/2006 | Yodh | ............. | B82Y 10/00 423/447.1 |
| 2014/0093728 A1* | 4/2014 | Shah | ............. | C01B 31/0293 428/367 |

* cited by examiner

*Primary Examiner* — Hannah Pak
(74) *Attorney, Agent, or Firm* — McDermott Will & Emery LLP

(57) ABSTRACT

Carbon nanostructures free of an adhered growth substrate can include a plurality of carbon nanotubes that are branched, crosslinked, and share common walls with one another. Under applied shear, crosslinks between the carbon nanotubes in carbon nanostructures can break to form fractured carbon nanotubes that are branched and share common walls. Methods for making polymer composites from carbon nanostructures can include combining a polymer matrix and a plurality of carbon nanostructures that are free of an adhered growth substrate, and dispersing the carbon nanostructures in the polymer matrix under applied shear. The applied shear breaks crosslinks between the carbon nanotubes to form a plurality of fractured carbon nanotubes that are dispersed as individuals in the polymer matrix. Polymer composites can include a polymer matrix and a plurality of fractured carbon nanotubes dispersed as individuals in the polymer matrix.

14 Claims, 9 Drawing Sheets

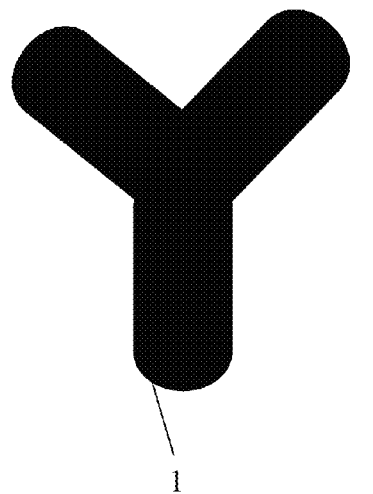
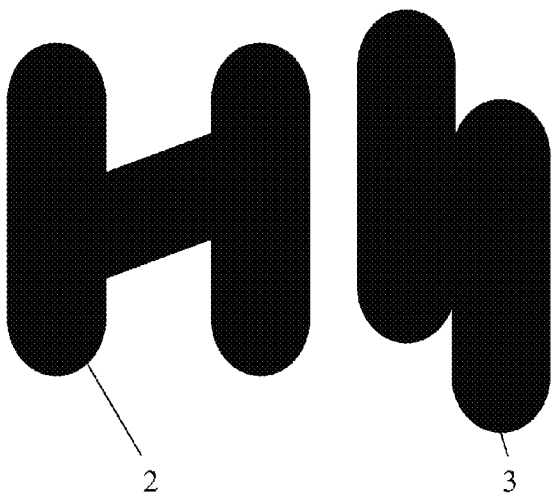
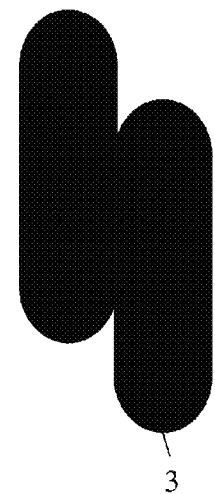
FIGURE 1A       FIGURE 1B       FIGURE 1C
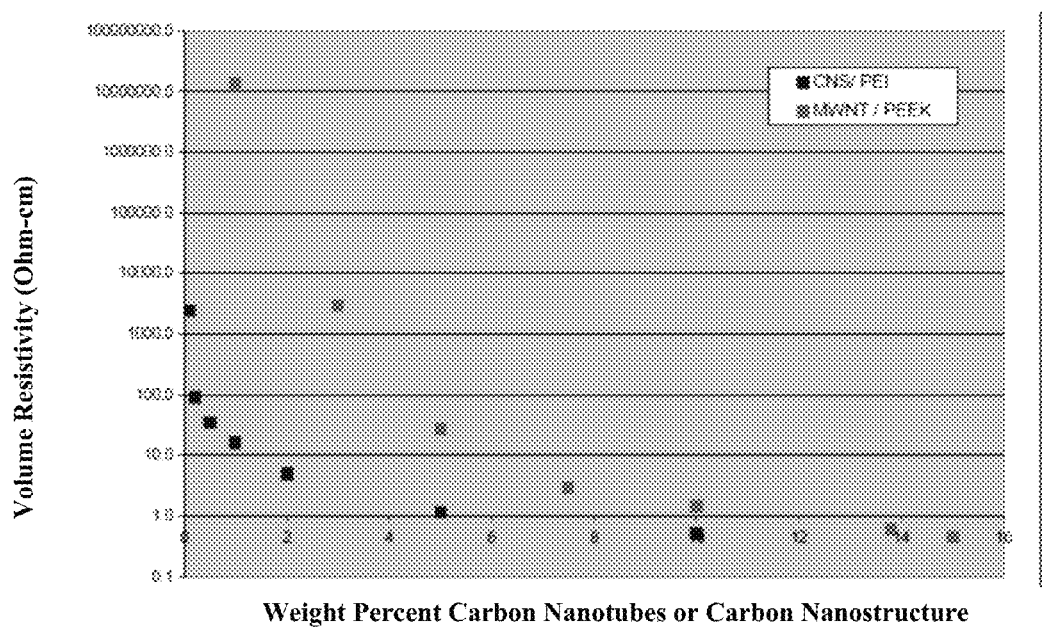
Weight Percent Carbon Nanotubes or Carbon Nanostructure
FIGURE 2

COMPOSITE MATERIALS FORMED BY SHEAR MIXING OF CARBON NANOSTRUCTURES AND RELATED METHODS

CROSS-REFERENCE TO RELATED APPLICATIONS

This application is a divisional of U.S. patent application Ser. No. 14/040,529, filed on Sep. 27, 2013, which claims the benefit of priority under 35 U.S.C. §119 from U.S. Provisional Patent Applications 61/707,738, filed on Sep. 28, 2012, and 61/722,085, filed on Nov. 2, 2012, each of which is incorporated herein by reference in its entirety.

STATEMENT REGARDING FEDERALLY SPONSORED RESEARCH OR DEVELOPMENT

Not applicable.

FIELD

The present disclosure generally relates to carbon nanostructures, and, more particularly, to polymer composites formed using carbon nanostructures.

BACKGROUND

Carbon nanotubes (CNTs) have been proposed for use in a number of applications that can take advantage of their unique combination of chemical, mechanical, electrical, and thermal properties. In many instances, these properties can be tailored to the requirements of a particular application by adjusting any combination of carbon nanotube length, diameter, chirality, functionality, and like structural features. Various difficulties have been widely recognized in many applications when working with individual carbon nanotubes. These difficulties can include, but are not limited to, poor solvent solubility, limited dispersibility in composite matrices, inadequate purity, and the like. Without being bound by any theory or mechanism, it is believed that many of these issues can arise due to the strong van der Waals forces that occur between individual carbon nanotubes, thereby causing them to group into bundles or ropes, as known in the art. The extreme aspect ratio of carbon nanotubes can also lead to physical entanglement that can further contribute to these difficulties. The foregoing issues and others can often result in lower than anticipated property enhancements and/or inconsistent performance when individual carbon nanotubes are employed in a chosen application. Although there are various techniques available for de-bundling carbon nanotube ropes, bundles or agglomerates into individual, well-separated members, many of these techniques can detrimentally impact the desirable property enhancements that pristine carbon nanotubes are able to provide. In addition, widespread concerns have been raised regarding the environmental health and safety profile of individual carbon nanotubes due to their small size. Furthermore, the cost of producing individual carbon nanotubes may be prohibitive for the commercial viability of these entities in many instances.

In view of the foregoing, techniques for producing well-separated, individual carbon nanotubes while addressing at least some of the other foregoing difficulties would be highly desirable in the art. The present disclosure satisfies the foregoing needs and provides related advantages as well.

SUMMARY

In some embodiments, the present disclosure provides methods for making polymer composites. The methods include combining a plurality of carbon nanostructures and a polymer matrix, and dispersing the carbon nanostructures in the polymer matrix under applied shear. The carbon nanostructures are each free of an adhered growth substrate and contain a plurality of carbon nanotubes that are branched, crosslinked, and share common walls with one another. The applied shear breaks crosslinks between the carbon nanotubes to form a plurality of fractured carbon nanotubes that are dispersed as individuals in the polymer matrix. The plurality of fractured carbon nanotubes contains carbon nanotubes that are branched and share common walls with one another.

In some embodiments, the present disclosure provides polymer composites formed from carbon nanostructures. In some embodiments, the polymer composites can be formed by methods including combining a plurality of carbon nanostructures and a polymer matrix, and dispersing the carbon nanostructures in the polymer matrix under applied shear. The carbon nanostructures are each free of an adhered growth substrate and contain a plurality of carbon nanotubes that are branched, crosslinked, and share common walls with one another. The applied shear breaks crosslinks between the carbon nanotubes to form a plurality of fractured carbon nanotubes that are dispersed as individuals in the polymer matrix. The plurality of fractured carbon nanotubes contains carbon nanotubes that are branched and share common walls with one another.

In some embodiments, polymer composites can include a polymer matrix, and a plurality of fractured carbon nanotubes that are dispersed as individuals in the polymer matrix. The plurality of fractured carbon nanotubes includes carbon nanotubes that are branched and share common walls with one another.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIGS. 1A-1C show illustrative depictions of carbon nanotubes that are branched, crosslinked, and share common walls, respectively;

FIG. 2 shows a comparative volume resistivity plot for a carbon nanostructure composite material and a multi-walled carbon nanotube composite material;

DETAILED DESCRIPTION

Figure 3:
FIG. 3 shows a SEM image of an illustrative polymer composite containing intact carbon nanostructures encapsulated in a polymer matrix.

The present disclosure is directed, in part, to composite materials formed from carbon nanostructures, particularly polymer composites. The present disclosure is also directed, in part, to methods for forming composite materials starting from carbon nanostructures, particularly polymer composites.

As discussed above, various difficulties can sometimes be encountered in the production and use of individual carbon nanotubes in many applications. Formation of composite materials containing carbon nanotubes, especially polymer composites, represents one instance where at least some of the above difficulties can be particularly prevalent. Specifically, when forming composite materials, it can often be difficult to effectively debundle carbon nanotube ropes in order to achieve an adequate carbon nanotube dispersion in a composite matrix. Moreover, surfactants used in conjunction with debundling carbon nanotube ropes can sometimes become incorporated in a composite matrix and degrade the resultant composite properties over those that could otherwise have been attained.

In order to provide carbon nanotubes in an easily handled form that addresses many of the foregoing issues, at least some of the present inventors previously developed techniques to prepare carbon nanostructures infused to various fiber materials through direct growth of the carbon nanostructures thereon. As used herein, the term "carbon nanostructure" refers to a plurality of carbon nanotubes that can exist as a polymeric structure by being interdigitated, branched, crosslinked, and/or sharing common walls with one another. Carbon nanostructures can be considered to have carbon nanotubes as a base monomer unit of their polymeric structure. By growing carbon nanostructures on a substrate (e.g., a fiber material) under carbon nanostructure growth conditions, at least a portion of the carbon nanotubes in the carbon nanostructures can be aligned substantially parallel to one another, much like the parallel carbon nanotube alignment seen in conventional carbon nanotube forests. Carbon nanostructure-infused fiber materials can provide carbon nanotubes in a form that is much more easily handled than are unsupported carbon nanotubes. Infused carbon nanotubes in the form of carbon nanostructures also can represent a much lower environmental health and safety concern than do free carbon nanotubes, which can form sub-micron particles with potential inhalation toxicity effects. Moreover, infusing carbon nanostructures to a fiber material can still allow the beneficial carbon nanotube properties (i.e., any combination of chemical, mechanical, electrical, and thermal properties) to be conveyed to the fiber material and/or a matrix material in which the carbon nanostructure-infused fiber material is disposed.

Conventional carbon nanotube growth processes have most often focused on the production of high purity carbon nanotubes containing a minimum number of defects. While such conventional carbon nanotube growth processes typically take several minutes or more to produce carbon nanotubes having micron-scale lengths, the carbon nanostructure growth processes described herein employ a nominal carbon nanotube growth rate on the order of several microns per second in a continuous, in situ growth process on a growth substrate. As a result, the carbon nanotubes within the carbon nanostructures are more defective compared to a conventional carbon nanotube forest or unsupported carbon nanotubes. That is, the resultant carbon nanostructures contain carbon nanotubes that are highly entangled, branched, crosslinked, and share common walls, thereby forming a macrostructure that is defined by more than just the structural features of carbon nanotubes themselves. Moreover, the ability to grow carbon nanostructures continuously on a growth substrate under such rapid growth conditions can provide access to much greater quantities of carbon nanostructures than can related carbon nanotube growth processes, thereby improving process economics. In most cases, prior preparations of carbon nanostructure-infused fiber materials have resulted in very robust adherence of the carbon nanostructures to the fiber material, such that the carbon nanostructures are not easily removed from the fiber material, at least without significantly damaging the carbon nanotubes themselves.

Although carbon nanostructure-infused fiber materials can be used satisfactorily as a replacement for individual carbon nanotubes in many applications, at least some of the present inventors recognized that in some instances it might be more desirable to utilize carbon nanostructures that are free of the fiber material upon which they are grown (i.e., "free" carbon nanostructures), while retaining the ready carbon nanotube handling attributes afforded by having the carbon nanostructures infused to the fiber material. Techniques for affecting removal of carbon nanostructures from a growth substrate are set forth hereinbelow and are described in more detail in commonly owned U.S. patent application Ser. No. 14/035,856 entitled "Carbon Nanostructures and Methods for Making the Same," filed on Sep. 24, 2013 and incorporated herein by reference in its entirety.

In regard to the above, carbon nanostructures can be removed from their growth substrate as a low density carbon nanostructure flake or like particulate material. The features of branching, crosslinking, and sharing common walls among the carbon nanotubes can be preserved when the carbon nanostructures are removed from a growth substrate, such that the carbon nanotubes are in a pre-exfoliated (i.e., at least partially separated) state. The combination of these features can make the carbon nanostructures readily dispersible in a fluid medium without the need to initially disperse the carbon nanotubes into individuals through use of a surfactant. The pre-exfoliated state of the carbon nanotubes in the carbon nanostructures can also make them more readily dispersible in a composite matrix, as discussed in more detail hereinbelow.

Another advantage of carbon nanostructures over individual carbon nanotubes is that even "free" carbon nanostructures are believed to provide a better environmental health and safety profile compared to individual carbon nanotubes. Because carbon nanostructures are macroscopic in size relative to an individual carbon nanotube, it is believed that even "free" carbon nanostructures can present fewer toxicity concerns and rival the environmental health and safety profile of infused carbon nanotubes. Without being bound by any theory, it is believed that the improved environmental health and safety profile can result, at least in part, from the size and relative structural integrity of the carbon nanostructures themselves. That is, the bonding interactions between carbon nanotubes in the carbon nanostructures can provide a robust material that does not readily separate into harmful submicron particulates, such as those associated with respiration toxicity.

As a further advantage of carbon nanostructures relative to individual carbon nanotubes, it is believed that carbon nanostructures can be produced more rapidly and inexpensively and with a higher carbon feedstock conversion percentage than can related carbon nanotube production techniques. Some of the best performing carbon nanotube growth processes to date have exhibited a carbon conversion efficiency of at most about 60%. In contrast, carbon nanostructures can be produced on a fiber material with carbon conversion efficiencies of greater than about 85%. Thus, carbon nanostructures provide a more efficient use of carbon feedstock material and associated lower production costs.

Moreover, due to their different and sometimes superior properties compared to carbon nanotubes, lower amounts of "free" carbon nanostructures can be used in some applications to achieve a comparable effect only seen with higher quantities of individual carbon nanotubes. Without being bound by any theory or mechanism, it is believed that improved dispersion of the carbon nanostructures and the resultant property expression in various matrices can afford the superior performance of carbon nanostructures over carbon nanotubes. Remaining unbound by any theory or mechanism, it is believed that the enhanced dispersion of carbon nanostructures results from their low density relative to individual carbon nanotubes.

In much of the description that follows hereinbelow, reference is made to polymer composites. However, it is to be recognized that in alternative embodiments, other types of composite materials such as for example, ceramic matrix composites, can be formed in a like manner.

One application in which "free" carbon nanostructures can provide particular benefits is that of forming polymer composites or other types of composite materials. Although carbon nanostructure-infused fiber materials can be advantageously employed in this regard, the fiber material often simply represents a carrier to facilitate handling and deployment of the carbon nanostructures in the polymer matrix. However, the fiber material can also provide mechanical reinforcement, even when coated with infused carbon nanostructures. When the reinforcement contribution of the fiber material is not needed in a polymer composite (e.g., the conveyed properties of the carbon nanotubes are instead of primary interest), the fiber material can represent an unwanted weight contribution to the polymer composite. Particularly in aeronautic and aerospace applications, the weight contribution from the fiber material can be significant, especially if its reinforcement effects are not needed in a given location of a polymer composite.

Moreover, the fabrication of certain types of parts made from fiber-containing polymer composites can be quite problematic. For example, extruded filaments and injection-molded parts can be difficult to fabricate from polymer matrices containing a fiber material. In contrast, these difficulties are significantly reduced when the fiber material is absent and only nanomaterials are present.

In some embodiments, an unmodified fiber material (i.e., a commercial fiber material, with or without a sizing coated thereon, that is not infused with carbon nanostructures, carbon nanotubes, or other nanomaterials) can be incorporated in the composites described herein. For example, when a localized enhancement of properties is desired in a polymer composite, a fiber material (either an unmodified fiber material or a carbon nanostructure-infused fiber material, for example) can be included only in regions of the polymer composite where mechanical strength is needed, and carbon nanostructures or a product formed therefrom can be included only in regions of the polymer composite where nanomaterial enhancement is needed, thereby allowing tailoring of the composite's properties. Thus, the enhancement effects provided by the fiber material and the carbon nanostructures can be effectively separated in the polymer composite. Moreover, because "free" carbon nanostructures and a fiber material can be introduced separately into a polymer matrix, differing ratios of these components can be utilized than if only carbon nanostructure-infused fiber materials were used, thereby allowing further tailoring of the composite's properties to take place.

Given the above benefits, the present inventors investigated the preparation of polymer composites from carbon nanostructures separated from the growth substrate upon which they were formed (e.g., a fiber material). In some cases, enhanced composite properties could be realized in polymer composites containing carbon nanostructures relative to comparable polymer composites containing an equal weight of carbon nanotubes (for example, see FIG. 2). In order to obtain well-dispersed carbon nanostructures, the inventors employed high shear mixing of the carbon nanostructures and the polymer matrix in some embodiments. Surprisingly, the inventors found that high shear mixing resulted in alteration of the initial carbon nanostructure morphology. Specifically, the inventors found that high shear mixing resulted in the breaking of crosslinks between the carbon nanotubes within the carbon nanostructures to produce carbon nanotubes dispersed as individuals in the polymer matrix. The structural features of carbon nanotube branching and shared walls were predominantly retained, even after the crosslinks were removed under high shear mixing. Thus, the predominant structural features of the fractured carbon nanotubes formed from carbon nanostructures differ from those in conventional carbon nanotube polymer composites prepared by other techniques. As used herein, the term "fractured carbon nanotubes" will refer to carbon nanotubes prepared from carbon nanostructures under shear, in which the structural features of carbon nanotube branching and shared walls are predominantly retained. Such fractured carbon nanotubes can readily be differentiated from ordinary carbon nanotubes through standard carbon nanotube analytical techniques, such as SEM, for example.

In addition to the composite structure produced under shear mixing of carbon nanostructures, the inventors recognized that utilizing carbon nanostructures to produce individual carbon nanotubes in a polymer composite also presented further advantages over conventional composite formation techniques from carbon nanotube ropes or bundles. Foremost, the pre-exfoliated state of the carbon nanostructures can allow individual carbon nanotubes to be produced without utilizing a surfactant to debundle the carbon nanotubes from each other, thereby potentially improving the composite's properties. Further, since individual carbon nanotubes are produced in situ within the polymer matrix and remain trapped therein, potential inhalation toxicity effects can be reduced. Moreover, due to their higher solubility than carbon nanotube ropes, carbon nanostructures can allow access to higher quantities of individualized carbon nanotubes in a polymer matrix than can nanocomposites produced by other techniques, thereby potentially improving strength, stiffness, thermal conductivity and/or electrical conductivity as the quantity of the carbon nanotubes increases. Finally, the techniques described herein are compatible with high end materials such as, for example, ultra high molecular weight polyethylene and aramid polymers, thereby simplifying the formation of polymer composites from these materials. However, it is to be recognized that the foregoing advantages can also be realized in more traditional composite matrices as well, in the form of decreased production costs and shorter manufacturing times.

In various embodiments, polymer composites described herein can be formed from a plurality of carbon nanostructures. The carbon nanostructures can each include a plurality of carbon nanotubes in which the carbon nanotubes are branched, crosslinked, and share common walls with one another. It is to be recognized that every carbon nanotube in the plurality of carbon nanotubes does not necessarily have the foregoing structural features of branching, crosslinking, and sharing common walls. Rather, the plurality of carbon nanotubes as a whole can possess one or more of these structural features. That is, in some embodiments, at least a portion of the carbon nanotubes are branched, at least a portion of the carbon nanotubes are crosslinked, and at least a portion of the carbon nanotubes share common walls. FIGS. 1A-1C show illustrative depictions of carbon nanotubes 1-3 that are branched, crosslinked, and share common walls, respectively. The carbon nanotubes in the carbon nanostructures can be formed with branching, crosslinking, and sharing common walls with one another during formation of the carbon nanostructures on a growth substrate. Moreover, during formation of the carbon nanostructures on a growth substrate, the carbon nanotubes can be formed such that they are substantially parallel to one another in the carbon nanostructures. The carbon nanostructures can be considered to be a polymer having a carbon nanotube as a base monomer unit that is in parallel alignment with at least some other carbon nanotubes. It is to be further understood that every carbon nanotube in the carbon nanostructures need not necessarily be branched, crosslinked, or share common walls with other carbon nanotubes. For example, in some embodiments, at least a portion of the carbon nanotubes in the carbon nanostructures can be interdigitated with one another and/or with branched, crosslinked, or common wall carbon nanotubes in the remainder of the carbon nanostructure.

In some embodiments, the carbon nanostructures can have a web-like morphology that results in the carbon nanostructures having a low initial bulk density. As-produced carbon nanostructures can have an initial bulk density ranging between about 0.003 g/cm$^3$ to about 0.015 g/cm$^3$. Further consolidation and coating to produce a carbon nanostructure flake or like material can raise the initial bulk density to a range between about 0.1 g/cm$^3$ to about 0.15 g/cm$^3$. In some embodiments, optional further modification of the carbon nanostructures can be conducted to further alter the bulk density and/or another property of the carbon nanostructures. In some embodiments, the initial bulk density of the carbon nanostructures can be further altered by forming a coating on the carbon nanotubes of the carbon nanostructures and/or infiltrating the interior of the carbon nanostructures with various materials. Coating the carbon nanotubes and/or infiltrating the interior of the carbon nanostructures can also be used to further tailor the properties of the carbon nanostructures for use in various applications. Moreover, in some embodiments, forming a coating on the carbon nanotubes can desirably facilitate the handling of the carbon nanostructures. Further compaction can raise the bulk density to an upper limit of about 1 g/cm$^3$, with chemical modifications to the carbon nanostructure raising the bulk density to an upper limit of about 1.2 g/cm$^3$.

The polymer composites described herein can contain intact carbon nanostructures, or at least a portion of the carbon nanostructures can break down under applied shear to form fractured carbon nanotubes, as generally described above. Although polymer composites containing fractured carbon nanotubes are believed to present particular advantages, including those noted above, polymer composites containing intact carbon nanostructures are also contemplated by various embodiments of the present disclosure. In general, such polymer composites can include a polymer matrix and a plurality of carbon nanostructures dispersed in a polymer matrix. For example, if the carbon nanostructures are dispersed in a polymer matrix without applying sufficient shear to significantly break apart the carbon nanostructures, a carbon nanostructure polymer composite can be obtained. As described above, such polymer composites can display superior properties over like polymer composites containing a comparable weight carbon nanotubes. For example, FIG. 2 shows a comparative volume resistivity plot for a carbon nanostructure composite material and a multi-walled carbon nanotube composite material. As shown in FIG. 2, comparable volume resistivities in the composite material can be obtained with as low as $\frac{1}{4}^{th}$ to $\frac{1}{5}^{th}$ the weight percentage of carbon nanostructures relative to multi-walled carbon nanotubes. It is not believed that the differing matrix materials in the tested composite samples have an appreciable impact on their measured volume resistivities. In various embodiments, the type of matrix material employed in the polymer composites described herein is not believed to be particularly limited and can include, for example, thermoplastic, thermosetting, or elastomeric matrices, illustrative examples of each of which are provided below. FIG. 3 shows a SEM image of an illustrative polymer composite containing intact carbon nanostructures encapsulated in a polymer matrix.

Figure 4:
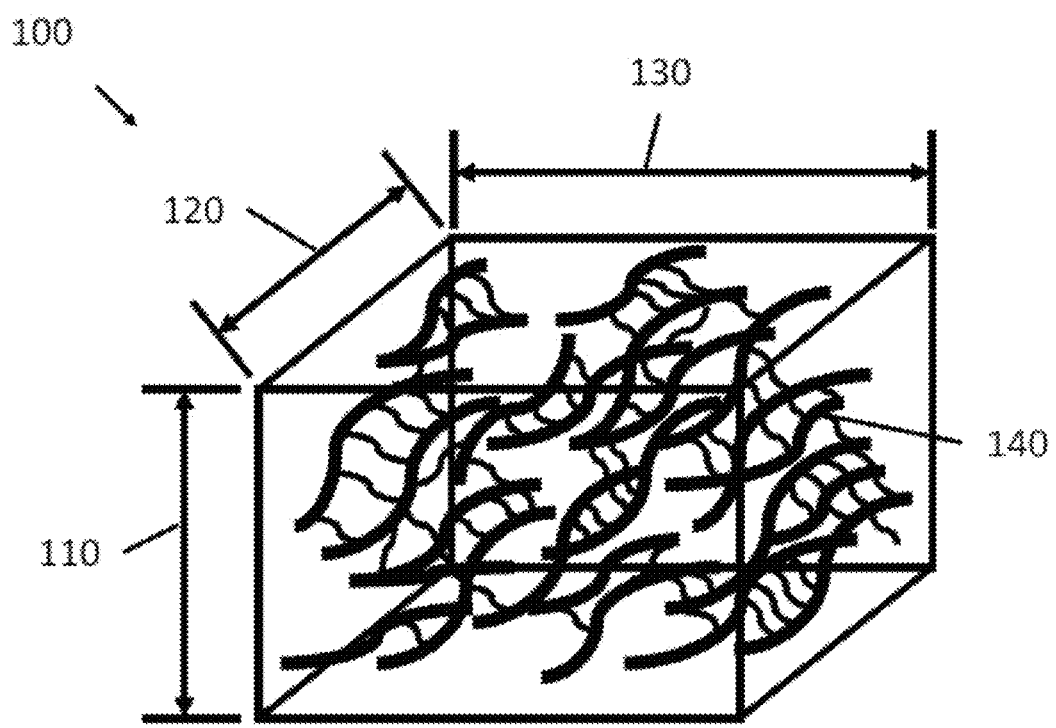
FIG. 4 shows an illustrative depiction of a carbon nanostructure flake material after isolation of the carbon nanostructure from a growth substrate.

In some embodiments, the carbon nanostructures can be in the form of a flake material after being removed from the growth substrate upon which the carbon nanostructures are initially formed. As used herein, the term "flake material" refers to a discrete particle having finite dimensions. FIG. 4 shows an illustrative depiction of a carbon nanostructure flake material after isolation of the carbon nanostructure from a growth substrate. Flake structure 100 can have first dimension 110 that is in a range from about 1 nm to about 35 µm thick, particularly about 1 nm to about 500 nm thick, including any value in between and any fraction thereof. Flake structure 100 can have second dimension 120 that is in a range from about 1 micron to about 750 microns tall, including any value in between and any fraction thereof. Flake structure 100 can have third dimension 130 that is only limited in size based on the length of the growth substrate upon which the carbon nanostructures are initially formed. For example, in some embodiments, the process for growing carbon nanostructures on a growth substrate can take place on a tow or roving of a fiber-based material of spoolable dimensions. The carbon nanostructure growth process can be continuous, and the carbon nanostructures can extend the entire length of a spool of fiber. Thus, in some embodiments, third dimension 130 can be in a range from about 1 m to about 10,000 m wide. Again, third dimension 130 can be very long because it represents the dimension that runs along the axis of the growth substrate upon which the carbon nanostructures are formed. Third dimension 130 can also be decreased to any desired length less than 1 m. For example, in some embodiments, third dimension 130 can be on the order of about 1 micron to about 10 microns, or about 10 microns to about 100 microns, or about 100 microns to about 500 microns, or about 500 microns to about 1 cm, or about 1 cm to about 100 cm, or about 100 cm to about 500 cm, up to any desired length, including any amount between the recited ranges and any fractions thereof. Since the growth substrate upon which the carbon nanostructures are formed can be quite large, exceptionally high molecular weight carbon nanostructures can be produced by forming the polymer-like morphology of the carbon nanostructures as a continuous layer on a suitable growth substrate.

Referring still to FIG. 4, flake structure 100 can include a webbed network of carbon nanotubes 140 in the form of a carbon nanotube polymer (i.e., a "carbon nanopolymer") having a molecular weight in a range from about 15,000 g/mol to about 150,000 g/mol, including all values in between and any fraction thereof. In some embodiments, the upper end of the molecular weight range can be even higher, including about 200,000 g/mol, about 500,000 g/mol, or about 1,000,000 g/mol. The higher molecular weights can be associated with carbon nanostructures that are dimensionally long. In various embodiments, the molecular weight can also be a function of the predominant carbon nanotube diameter and number of carbon nanotube walls present within the carbon nanostructures. In some embodiments, the carbon nanostructures can have a crosslinking density ranging between about 2 mol/cm$^3$ to about 80 mol/cm$^3$. The crosslinking density can be a function of the carbon nanostructure growth density on the surface of the growth substrate as well as the carbon nanostructure growth conditions.

Figure 5:
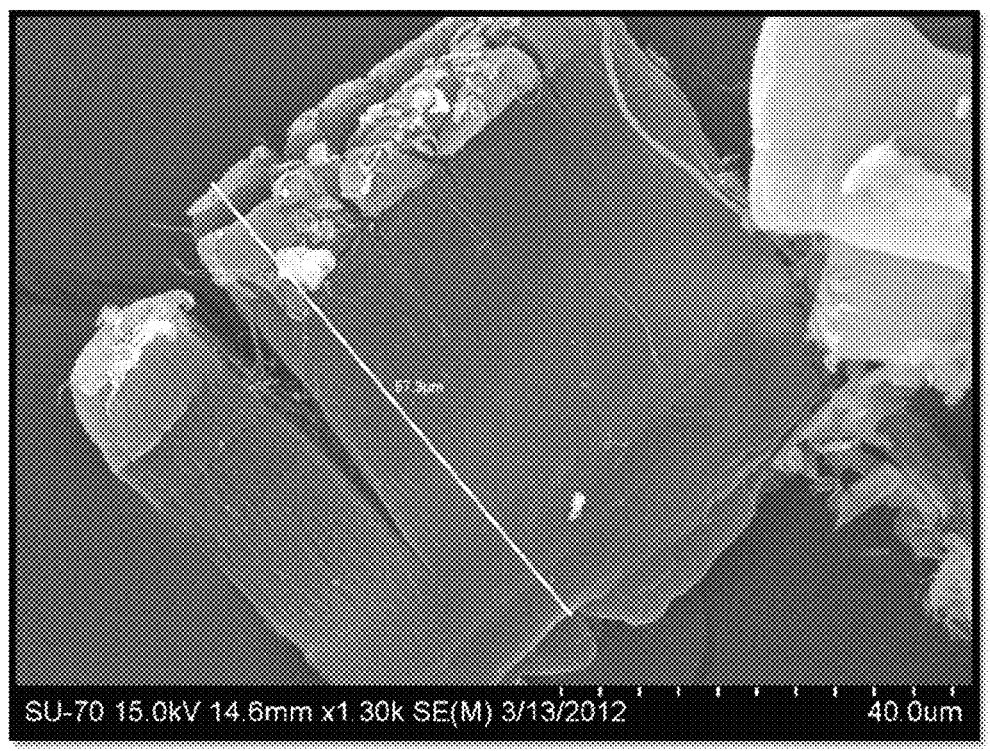
FIG. 5 shows a SEM image of an illustrative carbon nanostructure obtained as a flake material.

FIG. 5 shows a SEM image of an illustrative carbon nanostructure obtained as a flake material. The carbon nanostructure shown in FIG. 5 exists as a three dimensional microstructure due to the entanglement and crosslinking of its highly aligned carbon nanotubes. The aligned morphology is reflective of the formation of the carbon nanotubes on a growth substrate under rapid carbon nanotube growth conditions (e.g., several microns per second, such as about 2 microns per second to about 10 microns per second), thereby inducing substantially perpendicular carbon nanotube growth from the growth substrate. Without being bound by any theory or mechanism, it is believed that the rapid rate of carbon nanotube growth on the growth substrate can contribute, at least in part, to the complex structural morphology of the carbon nanostructure. In addition, the bulk density of the carbon nanostructure can be modulated to some degree by adjusting the carbon nanostructure growth conditions, including, for example, by changing the concentration of transition metal nanoparticle catalyst particles that are disposed on the growth substrate to initiate carbon nanotube growth. Suitable transition metal nanoparticle catalysts and carbon nanostructure growth conditions are outlined in more detail below.

As discussed above, it is believed that polymer composites formed from carbon nanostructures under applied shear conditions can present particular advantages for dispersing individualized carbon nanotubes in the polymer matrix. In various embodiments, such polymer composites can include a polymer matrix, and a plurality of fractured carbon nanotubes that are dispersed as individuals in the polymer matrix, in which the plurality of fractured carbon nanotubes includes carbon nanotubes that are branched and share common walls with one another. Again, it is to be recognized that every carbon nanotube in the plurality of fractured carbon nanotubes need not necessarily be branched and share common walls, rather that the plurality of fractured carbon nanotubes as a whole possesses these features. The carbon nanostructures used to form the polymer composites can be in any carbon nanostructure form described herein, such as a carbon nanostructure flake material, for example.

The form of the polymer composites containing the fractured carbon nanotubes is not believed to be particularly limited. In some embodiments, the polymer composites can be in the form of a polymer composite sheet. In some embodiments, the polymer composites can be in the form of a composite coating on an article. In some embodiments, the polymer composites can be in the form of a composite filament or a plurality of filaments, particularly extruded filaments. In some embodiments, composite filaments can be produced by extruding a melt of the polymer matrix and the fractured carbon nanostructures following application of a shearing force thereto. In some embodiments, a plurality of filaments can be produced in a two-dimensional or three-dimensional structure, such as a prepreg fabric structure. In some embodiments, the polymer composites can be in the form of a solid article, such as those produced by molding, extrusion, or pultrusion technologies.

In some embodiments, a polymer matrix, such as a softened thermoplastic polymer, can be mixed with carbon nanostructures under applied shear to produce fractured carbon nanotubes dispersed throughout the thermoplastic polymer. Thereafter, in some embodiments, the thermoplastic polymer can be chopped into pellets, and the pellets can then be molded to form an article. In some embodiments, molding the pellets to form an article can take place by injection molding or press molding. In some embodiments, the thermoplastic polymer pellets can be mixed with polymer pellets lacking fractured carbon nanostructures before undergoing molding. Thus, the quantity of fractured carbon nanostructures in the composites can be readily regulated. Shear mixing of carbon nanostructures with an elastomer or a thermosetting resin can take place in a similar manner. In each embodiment after dispersal of fractured carbon nanotubes in the polymer matrix, the polymer matrix can be hardened, such as after forming a desired article.

In various embodiments, at least a portion of the fractured carbon nanotubes can be functionalized. Suitable reactions for functionalizing carbon nanotubes will be familiar to one having ordinary skill in the art. The fractured carbon nanotubes can be functionalized after their formation from carbon nanostructures under applied shear, or the carbon nanostructures can be functionalized before being placed under applied shear, with the introduced functionality being carried forward into the fractured carbon nanotubes. Suitable processes for functionalizing the carbon nanotubes of carbon nanostructures are usually similar to those that can be used to functionalize individual carbon nanotubes and will be familiar to a person having ordinary skill in the art. In various embodiments, suitable techniques for functionalizing the carbon nanotubes of carbon nanostructures can include, for example, reacting the carbon nanostructures with an oxidant, such as $KMnO_4$, $H_2O_2$, $HNO_3$ or any combination thereof.

In some embodiments, at least a portion of the fractured carbon nanotubes can be covalently bonded to the polymer matrix. Such covalent bonding can take place through functional groups installed on the fractured carbon nanotubes, as described above, or a component of the polymer matrix can react directly with the fractured carbon nanotubes to form a covalent bond thereto. Covalent bonding between the fractured carbon nanotubes and the polymer matrix can result in a more effective conveyance of their beneficial properties to the polymer composite.

In some embodiments, the polymer composites described herein can also include a fiber material incorporated in the polymer matrix, in which the fiber material is not adhered to the fractured carbon nanotubes. In some embodiments, the fiber material can be a fiber material that is not modified with carbon nanostructures or carbon nanotubes. That is, in some embodiments, a commercial glass, carbon, ceramic, metal, or organic fiber (e.g., an aramid fiber) can be included in the polymer composites, if desired. Such commercial fibers can be sized or unsized. For example, in some embodiments, it can be desirable to introduce a commercial sized fiber into a polymer composite containing fractured carbon nanotubes, if mechanical reinforcement or other property enhancements are needed from a particular type of fiber. Likewise, in some embodiments, a fiber material can be incorporated in portions of a polymer composite in which fractured carbon nanotubes are not present, or different concentrations a fiber material can be incorporated in portions of a polymer composite where fractured carbon nanotubes are present versus where they are not. In some embodiments, the fiber material can be a carbon nanotube-infused fiber material.

In some embodiments, a fiber material can be introduced into the polymer composites unintentionally, particularly as a residual effect of removing carbon nanostructures from a growth substrate. As described hereinbelow, during removal of carbon nanostructures from a fiber material, fragments of the fiber material can become liberated from the bulk fiber and admix with the "free" carbon nanostructures. Although various methods for separating carbon nanostructures from fragments of a non-adhered fiber material are described hereinbelow, residual fragments of the fiber material can also become incorporated in the polymer composites described herein, particularly if operations are not undertaken to separate the fiber material fragments from the carbon nanostructures.

In general, it is not believed that the concentration of fractured carbon nanotubes in the polymer composites described herein is particularly limited, other than being constrained by the quantity of carbon nanostructures that can be effectively sheared in a given quantity of polymer matrix. In some embodiments, effective shearing can take place when the polymer composite contains up to about 60% carbon nanostructures by weight. Accordingly, in some embodiments, the polymer composites can contain up to about 60% fractured carbon nanotubes by weight. In more particular embodiments, the polymer composites can contain between about 0.1% to about 15% fractured carbon nanotubes by weight. Within the foregoing range, various properties such as enhanced electrical conductivity and mechanical strength can be conveyed to the polymer composites via the fractured carbon nanotubes. In still more particular embodiments, a concentration of fractured carbon nanotubes in the polymer composites can range between about 3% to about 6% of the polymer composite by weight, or between about 1% to about 5% of the polymer composite by weight, or between about 2% to about 6% of the polymer composite by weight, or between about 5% to about 10% of the polymer composite by weight, or between about 10% to about 15% of the polymer composite by weight.

In some embodiments, polymer composites formed from carbon nanostructures can incorporate different amounts of carbon nanostructures or fractured carbon nanotubes in certain portions of the polymer matrix. That is, in some embodiments, a concentration of carbon nanostructures or fractured carbon nanotubes can vary throughout the polymer composite in a gradient manner. A gradient concentration can vary throughout the polymer composite in a continuous gradient, such that there is a steady increase or decrease in concentration throughout the composite in a particular direction, or the gradient can be stepped, such that the concentration increases or decreases in a non-continuous manner. In some embodiments, certain portions of the polymer composites can lack fractured carbon nanostructures altogether. In other embodiments, a concentration of carbon nanostructures or fractured carbon nanotubes throughout the polymer composite can be uniform.

Various additives can also be found in or on the carbon nanostructures from which the polymer composites are formed. Additives that can be present include, but are not limited to, a coating on the carbon nanotubes, a filler material in the interstitial space of the carbon nanostructures, transition metal nanoparticles, and any combination thereof. In some embodiments, certain additives can be covalently bonded to at least a portion of the carbon nanotubes in at least some of the carbon nanostructures.

In some embodiments, the polymer composites described herein can include a coating on the fractured carbon nanotubes. The coating can differ in composition from the polymer matrix of the polymer composite. Coatings can be applied to the carbon nanotubes of the carbon nanostructures before or after removal of the carbon nanostructures from a growth substrate. Application of a coating before removal of the carbon nanostructures from a growth substrate can, for example, protect the carbon nanotubes during the removal process or facilitate the removal process. In other embodiments, a coating can be applied to the carbon nanotubes of the carbon nanostructures after removal of the carbon nanostructures from their growth substrates. Regardless of when the coating is applied to the carbon nanotubes of the carbon nanostructures, the coating can be carried forward and remain on the fractured carbon nanotubes following the application of shear. In some embodiments, the coating on the fractured carbon nanotubes can include, for example, a metal coating or a ceramic coating. In some embodiments, the coating can be covalently bonded to the fractured carbon nanotubes via the carbon nanotube functionalization techniques discussed above.

In some or other embodiments, there can be a filler or other additive material present in at least the interstitial space between the carbon nanotubes of the carbon nanostructures (i.e., on the interior of the carbon nanostructures). The additive material can be present alone or in combination with a coating on the carbon nanotubes of the carbon nanostructures. When used in combination with a coating, the additive material can also be located on the exterior of the carbon nanostructures within the coating, in addition to being located within the interstitial space of the carbon nanostructures. Introduction of an additive material within the interstitial space of the carbon nanostructures or elsewhere within the carbon nanostructures can result in further modification of the properties of the carbon nanostructures. Without limitation, the inclusion of an additive material within the carbon nanostructures can result in modification of the carbon nanostructure's density, thermal properties, spectroscopic properties, mechanical strength, and the like. It is not believed that individual or bundled carbon nanotubes are capable of carrying an additive material in a like manner, since they lack a permanent interstitial space on the nanotube exterior to contain the additive material. Although there is empty space on the carbon nanotube interior, it is believed to be either very difficult or impossible to place an additive material in that location.

In various embodiments, an additive associated with the carbon nanostructures can become dispersed in a polymer matrix under applied shear. That is, as the carbon nanostructures undergo shear, the additive can be released into the polymer matrix and undergo dispersal. However, in some embodiments, certain additives can remain associated with the fractured carbon nanotubes without being released. For example, some coatings on the carbon nanotubes may not be released and dispersed into the polymer matrix, while other types of coatings may be released. Similarly, covalently bound additives may not be readily released into the polymer matrix upon shearing.

Figure 7:
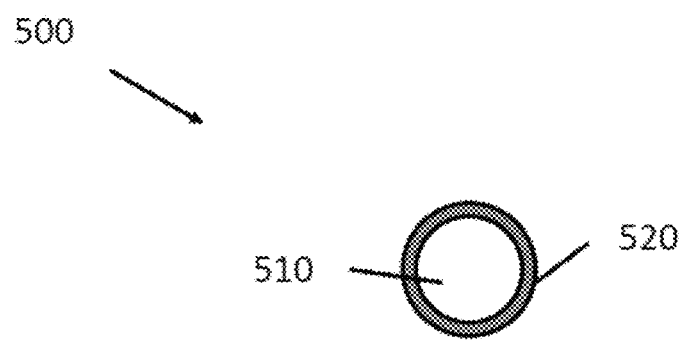
FIG. 7 shows an illustrative schematic of a transition metal nanoparticle coated with an anti-adhesive layer.

In some embodiments, the carbon nanostructures can contain a plurality of transition metal nanoparticles, where the transition metal nanoparticles can represent a catalyst that was used in synthesizing the carbon nanostructures. In some embodiments, the transition metal nanoparticles can be coated with an anti-adhesive coating that limits their adherence to a growth substrate or the carbon nanostructure to a growth substrate, as shown in FIG. 7. Suitable anti-adhesive coatings are discussed in more detail below. In various embodiments, the anti-adhesive coating can be carried along with the transition metal nanoparticles as the carbon nanostructures and the transition metal nanoparticles are removed from a growth substrate. In other embodiments, the anti-adhesive coating can be removed from the transition metal nanoparticles before or after they are incorporated into the carbon nanostructures. In still other embodiments, the transition metal nanoparticles can initially be incorporated into the carbon nanostructures and then subsequently removed. For example, in some embodiments, at least a portion of the transition metal nanoparticles can be removed from the carbon nanostructures by treating the carbon nanostructures with a mineral acid.

In various embodiments, the polymer matrix of the polymer composites described herein can be a thermoplastic polymer. Suitable thermoplastic polymers can include, for example, polypropylenes, polyethylenes, polyamides, polyesters, polycarbonates, polysulfones, aramid polymers, polyamide-imides, polyimides, polyetherimides, polyetheretherketones, and polyphenylene sulfides. In some embodiments, the polymer composites disclosed herein can employ a thermoplastic polymer such as, for example, polyethylene, polypropylene, polyethylene terephthalate, polybutylene terephthalate, polystyrene, polyvinyl chloride, polyvinyl alcohol, polyvinyl acetate, polyacrylonitrile, polyethyleneimine, and copolymers thereof. In some such embodiments, the thermoplastic polymer can be a low-end thermoplastic such as, for example, acrylonitrile-butadiene-styrene copolymer (ABS), a polycarbonate, a nylon, or any combination thereof. Techniques for mixing the thermoplastic polymer and the carbon nanostructures can include, for example, melt impregnation, solvent impregnation, powder impregnation, and the like.

In various embodiments, the polymer matrix of the polymer composites described herein can be a thermosetting polymer, also known as a thermosetting resin polymer or just a thermosetting resin. Suitable thermosetting resins can include, for example, phthalic/maleic type polyesters, vinyl ester polymers, epoxies, phenolics, cyanates, silicones, urethanes, bismaleimides, and nadic end-capped polyimides (e.g., PMR-15). The carbon nanostructures can be dispersed in a thermosetting resin using any suitable technique, and the thermosetting resin can then be cured to a hardened polymer thereafter. Suitable polymer composite processing techniques for thermosetting resins can include, for example, fiber layup, resin transfer molding, wet winding, vacuum assisted resin transfer molding, and prepreg manufacture.

In various embodiments, suitable elastomers for use in the polymer composites described herein can include, for example: (1) unsaturated rubbers; (a) natural polyisoprene: (i) cis-1,4-polyisoprene natural rubber, and (ii) trans-1,4-polyisoprene; (b) synthetic polyisoprene; (c) polybutadiene; (d) chloroprene rubber, such as polychloroprene (including NEOPRENE, BAYPREN, and the like); (e) butyl rubber (copolymer of isobutylene and isoprene); (f) halogenated butyl rubbers; (g) styrene-butadiene rubber (copolymer of styrene and butadiene); (h) nitrile rubber (copolymer of butadiene and acrylonitrile); and (i) hydrogenated nitrile rubbers (including THERBAN and ZETPOL); and (2) saturated rubbers; (a) ethylene propylene rubber, a copolymer of ethylene and propylene (EPM) and ethylene propylene diene rubber, a terpolymer of ethylene, propylene and a diene-component (EPDM); (b) epichlorohydrin rubber (ECO); (c) polyacrylic rubber; (d) silicone rubber; (e) fluorosilicone rubber; (f) fluoroelastomers (including VITON, TECNOFLON, FLUOREL, and DAI-EL); (g) perfluoroelastomers (including TECNOFLON PFR, KALREZ, CHEMRAZ, and PERLAST); (h) polyether block amides (PEBA); (i) chlorosulfonated polyethylene, such as HYPALON; and (j) ethylene-vinyl acetate (EVA).

In various embodiments, polymer composites described herein can be prepared by methods that include combining a plurality of carbon nanostructures and a polymer matrix, and dispersing the carbon nanostructures in the polymer matrix under applied shear. The applied shear breaks cross-links between the carbon nanotubes to form a plurality of fractured carbon nanotubes that are dispersed as individuals in the polymer matrix. The plurality of fractured carbon nanotubes contain carbon nanotubes that are branched and share common walls with one another.

In some embodiments, the applied shear can completely break down the carbon nanostructures, such that the resultant polymer composites contain only fractured carbon nanotubes. In other embodiments, break down of the carbon nanostructures can be incomplete, such that the resultant polymer composites contain a mixture of fractured carbon nanotubes and intact carbon nanostructures.

In some embodiments, the methods described herein can further include hardening the polymer matrix after dispersing the fractured carbon nanotubes as individuals therein. For a thermoplastic matrix, hardening can involve cooling the thermoplastic matrix below its glass transition temperature. For a thermosetting resin, hardening can involve curing the thermosetting resin to form a polymer.

In some embodiments, methods described herein can further include incorporating a fiber material in the polymer matrix. The type of fiber material is not believed to be particularly limited and can include, for example, glass, ceramic, carbon, metal or aramid fibers. In some embodiments, the fiber material can be a sized or unsized commercial fiber material. In other embodiments, the fiber material can be a carbon nanostructure-infused fiber material. Suitable techniques for incorporating a fiber material into the polymer matrix can include, for example, blending, laying up, and the like.

Although the foregoing embodiments have been described in reference to polymer composites, it is to be recognized that other types of composite materials are also contemplated by the present disclosure. In some embodiments, as an alternative to polymer matrices, the composite materials described herein can contain a ceramic matrix, a carbon matrix, or a metal matrix.

In some embodiments, methods described herein can further include forming carbon nanostructures on a growth substrate, and removing the carbon nanostructures from the growth substrate prior to combining the carbon nanostructures with the polymer matrix. Production of carbon nanostructures on a growth substrate and subsequent removal therefrom by various techniques are now further described hereinbelow.

In some embodiments, processes described herein can include preparing carbon nanostructures on a growth substrate with one or more provisions for removal of the carbon nanostructures once synthesis of the carbon nanostructures is complete. The provision(s) for removing the carbon nanostructures from the growth substrate can include one or more techniques selected from the group consisting of: (i) providing an anti-adhesive coating on the growth substrate, (ii) providing an anti-adhesive coating on a transition metal nanoparticle catalyst employed in synthesizing the carbon nanostructures, (iii) providing a transition metal nanoparticle catalyst with a counter ion that etches the growth substrate, thereby weakening the adherence of the carbon nanostructures to the growth substrate, and (iv) conducting an etching operation after carbon nanostructure synthesis is complete to weaken adherence of the carbon nanostructures to the growth substrate. Combinations of these techniques can also be used. In combination with these techniques, various fluid shearing or mechanical shearing operations can be carried out to affect the removal of the carbon nanostructure from the growth substrate.

In some embodiments, processes disclosed herein can include removing carbon nanostructures from a growth substrate. In some embodiments, removing carbon nanostructures from a growth substrate can include using a high pressure liquid or gas to separate the carbon nanostructures from the growth substrate, separating contaminants derived from the growth substrate (e.g., fragmented growth substrate) from the carbon nanostructures, collecting the carbon nanostructures with air or from a liquid medium with the aid of a filter medium, and isolating the carbon nanostructures from the filter medium. In various embodiments, separating contaminants derived from the growth substrate from the carbon nanostructures can take place by a technique selected from the group consisting of cyclone filtering, density separation, size-based separation, and any combination thereof. The foregoing processes are described in more detail hereinbelow.

Figure 6:
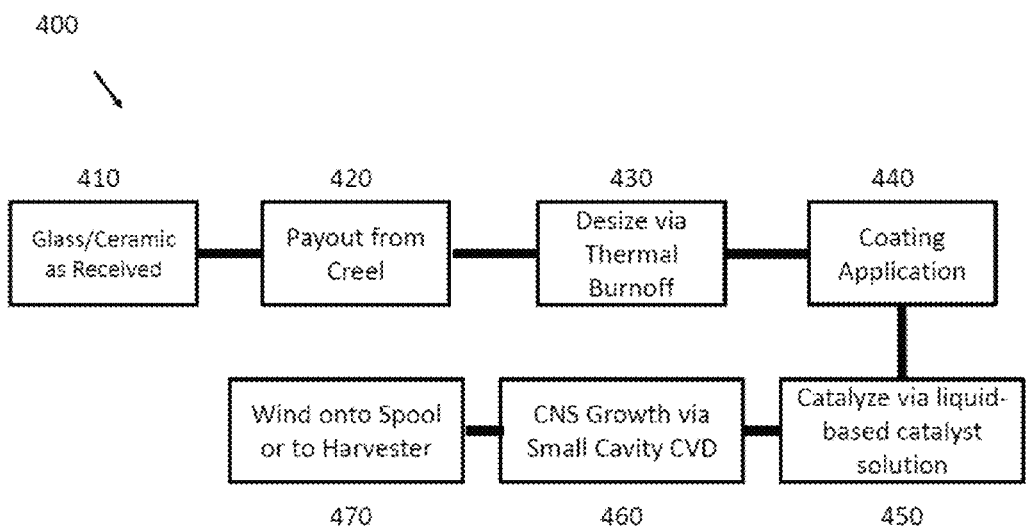
FIG. 6 shows a flow diagram of an illustrative carbon nanostructure growth process which employs an exemplary glass or ceramic growth substrate.

FIG. 6 shows a flow diagram of an illustrative carbon nanostructure growth process 400, which employs an exemplary glass or ceramic growth substrate 410. It is to be understood that the choice of a glass or ceramic growth substrate is merely exemplary, and the substrate can also be metal, an organic polymer (e.g., aramid), basalt fiber, or carbon, for example. In some embodiments, the growth substrate can be a fiber material of spoolable dimensions, thereby allowing formation of the carbon nanostructures to take place continuously on the growth substrate as the growth substrate is conveyed from a first location to a second location. Carbon nanostructure growth process 400 can employ growth substrates in a variety of forms such as fibers, tows, yarns, woven and non-woven fabrics, sheets, tapes, belts and the like. For convenience in continuous syntheses, tows and yarns are particularly convenient fiber materials.

Referring still to FIG. 6, such a fiber material can be meted out from a payout creel at operation 420 and delivered to an optional desizing station at operation 430. Desizing is ordinarily conducted when preparing carbon nanostructure-infused fiber materials in order to increase the degree of infusion of the carbon nanostructures to the fiber material. However, when preparing isolated carbon nanostructures, desizing operation 430 can be skipped, for example, if the sizing promotes a decreased degree of adhesion of the transition metal nanoparticle catalyst and/or carbon nanostructures to the growth substrate, thereby facilitating removal of the carbon nanostructure. Numerous sizing compositions associated with fiber substrates can contain binders and coupling agents that primarily provide anti-abrasive effects, but typically do not exhibit exceptional adhesion to fiber surface. Thus, forming carbon nanostructures on a growth substrate in the presence of a sizing can actually promote subsequent isolation of the carbon nanostructures in some embodiments. For this reason, it can be beneficial to skip desizing operation 430, in some embodiments.

In some embodiments, an additional coating application can take place at operation 440. Additional coatings that can be applied in operation 440 include, for example, colloidal ceramics, glass, silanes, or siloxanes that can decrease catalyst and/or carbon nanostructure adhesion to the growth substrate. In some embodiments, the combination of a sizing and the additional coating can provide an anti-adhesive coating that can promote removal of the carbon nanostructures from the growth substrate. In some embodiments, the sizing alone can provide sufficient anti-adhesive properties to facilitate carbon nanostructure removal from the growth substrate, as discussed above. In some embodiments, the additional coating provided in operation 440 alone can provide sufficient anti-adhesive properties to facilitate carbon nanostructure removal from the growth substrate. In still further embodiments, neither the sizing nor the additional coating, either alone or in combination, provides sufficient anti-adhesive properties to facilitate carbon nanostructure removal. In such embodiments, decreased adhesion of the carbon nanostructures to the growth substrate can be attained by judicious choice of the transition metal nanoparticles used to promote growth of the carbon nanostructures on the growth substrate. Specifically, in some such embodiments, operation 450 can employ a catalyst that is specifically chosen for its poor adhesive characteristics.

Referring still to FIG. 6, after optional desizing operation 430 and optional coating operation 440, catalyst is applied to the growth substrate in operation 450, and carbon nanostructure growth is affected through a small cavity CVD process in operation 460. The resulting carbon nanostructure-infused growth substrate (i.e., a carbon nanostructure-infused fiber material) can be wound for storage and subsequent carbon nanostructure removal or immediately taken into a carbon nanostructure isolation process employing a harvester, as indicated in operation 470.

In some embodiments, the growth substrate can be modified to promote removal of carbon nanostructures therefrom. In some embodiments, the growth substrate used for producing carbon nanostructures can be modified to include an anti-adhesive coating that limits adherence of the carbon nanostructures to the growth substrate. The anti-adhesive coating can include a sizing that is commercially applied to the growth substrate, or the anti-adhesive coating can be applied after receipt of the growth substrate. In some embodiments, a sizing can be removed from the growth substrate prior to applying an anti-adhesive coating. In other embodiments, a sizing can be applied to a growth substrate in which a sizing is present.

In some embodiments, the carbon nanostructures can be grown on the growth substrate from a catalyst that includes a plurality of transition metal nanoparticles, as generally described hereinbelow. In some embodiments, one mode for catalyst application onto the growth substrate can be through particle adsorption, such as through direct catalyst application using a liquid or colloidal precursor-based deposition. Suitable transition metal nanoparticle catalysts can include any d-block transition metal or d-block transition metal salt. In some embodiments, a transition metal salt can be applied to the growth substrate without thermal treatments. In other embodiments, a transition metal salt can be converted into a zero-valent transition metal on the growth substrate through a thermal treatment.

In some embodiments, the transition metal nanoparticles can be coated with an anti-adhesive coating that limits their adherence to the growth substrate. As discussed above, coating the transition metal nanoparticles with an anti-adhesive coating can also promote removal of the carbon nanostructures from the growth substrate following synthesis of the carbon nanostructures. Anti-adhesive coatings suitable for use in conjunction with coating the transition metal nanoparticles can include the same anti-adhesive coatings used for coating the growth substrate. FIG. 7 shows an illustrative schematic of a transition metal nanoparticle coated with an anti-adhesive layer. As shown in FIG. 7, coated catalyst 500 can include core catalyst particle 510 overcoated with anti-adhesive layer 520. In some embodiments, colloidal nanoparticle solutions can be used in which an exterior layer about the nanoparticle promotes growth substrate to nanoparticle adhesion but discourages carbon nanostructure to nanoparticle adhesion, thereby limiting adherence of the carbon nanostructures to the growth substrate.

Figure 8:
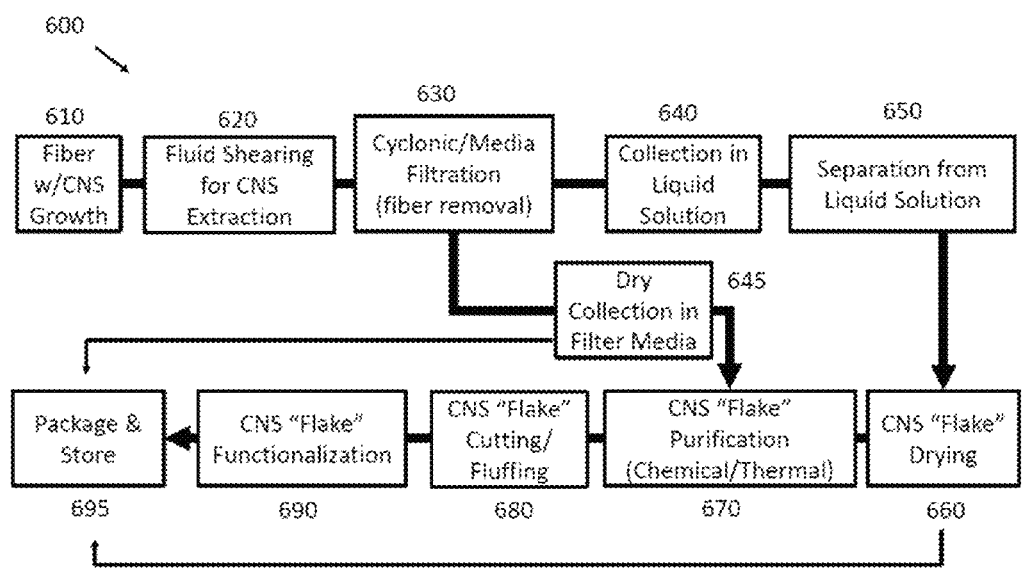
FIG. 8 shows a flow diagram of an illustrative process for isolating carbon nanostructures from a growth substrate.

FIG. 8 shows a flow diagram of an illustrative process for isolating carbon nanostructures from a growth substrate. As shown in FIG. 8, process 600 begins with a carbon nanostructure-infused fiber being provided in operation 610. Non-fibrous growth substrates onto which a carbon nanostructure has been grown can be used in a like manner. Fluid shearing can be conducted at operation 620 using a gas or a liquid in order to accomplish removal of the carbon nanostructures from the fiber material. In some cases, fluid shearing can result in at least a portion of the fiber material being liberated from the bulk fiber and incorporated with the free carbon nanostructure, while not being adhered thereto. If needed, in operation 630, the liberated carbon nanostructure can be subjected to cyclonic/media filtration in order to remove the non-adhered fiber material fragments. Density-based or size-based separation techniques can also be used to bring about separation of the carbon nanostructures from the non-adhered fiber material. In the case of gas shearing, the carbon nanostructure can be collected in dry form on a filter medium in operation 645. The resultant dry flake material collected in operation 645 can be subjected to any optional further chemical or thermal purification, as outlined further in FIG. 8. In the case of liquid shearing, the liquid can be collected in operation 640, and separation of the carbon nanostructure from the liquid can take place in operation 650, ultimately producing a dry flake material in operation 660. The carbon nanostructure flake material isolated in operation 660 can be similar to that produced in operation 645. After isolating the carbon nanostructure flake material in operation 660, it can be ready for packaging and/or storage in operation 695. In processes employing gas shearing to remove the carbon nanostructure, the carbon nanostructures can be dry collected in a filter at operation 645. Prior to packaging and/or storage in operation 695, the crude product formed by either shearing technique can undergo optional chemical and/or thermal purification in operation 670. These purification processes can be similar to those conducted when purifying traditional carbon nanotubes. By way of example, purification conducted in operation 670 can involve removal of a catalyst used to affect carbon nanostructure growth, such as, for example, through treatment with liquid bromine. Other purification techniques can be envisioned by one having ordinary skill in the art.

Referring still to FIG. 8, the carbon nanostructures produced by either shearing technique can undergo further processing by cutting or fluffing in operation 680. Such cutting and fluffing can involve mechanical ball milling, grinding, blending, chemical processes, or any combination thereof. Further optionally, in operation 690, the carbon nanostructures can be further functionalized using any technique in which carbon nanotubes are normally modified or functionalized. Suitable functionalization techniques in operation 690 can include, for example, plasma processing, chemical etching, and the like. Functionalization of the carbon nanostructures in this manner can produce chemical functional group handles that can be used for further modifications. For example, in some embodiments, a chemical etch can be employed to form carboxylic acid groups on the carbon nanostructures that can be used to bring about covalent attachment to any number of further entities including, for example, the matrix material of a composite material. In this regard, a functionalized carbon nanostructure can provide a superior reinforcement material in a composite matrix, since it can provide multiple sites for covalent attachment to the composite's matrix material in all dimensions, or provide a source for fractured carbon nanotubes that can also do the same.

In addition to facilitating the covalent attachment of carbon nanostructures to the matrix of a composite material, functionalization of carbon nanostructures can also allow other groups to be covalently attached to the carbon nanostructures. In some embodiments, access to other covalently linked entities such as synthetic or biopolymers can be realized via functional group handles produced in post-processing carbon nanostructure functionalization. For example, carbon nanostructures can be linked to polyethylene glycol (e.g., through ester bonds formed from carboxylic acid groups on the carbon nanostructures) to provide PEGylated carbon nanostructures, which can confer improved water solubility to the carbon nanostructures. In some embodiments, the carbon nanostructures can provide a platform for covalent attachment to biomolecules to facilitate biosensor manufacture. In this regard, the carbon nanostructures can provide improved electrical percolation pathways for enhanced detection sensitivity relative to other carbon nanotube-based biosensors employing individualized carbon nanotubes or even conventional carbon nanotube forests. Biomolecules of interest for sensor development can include, for example, peptides, proteins, enzymes, carbohydrates, glycoproteins, DNA, RNA, and the like.

Figure 9:
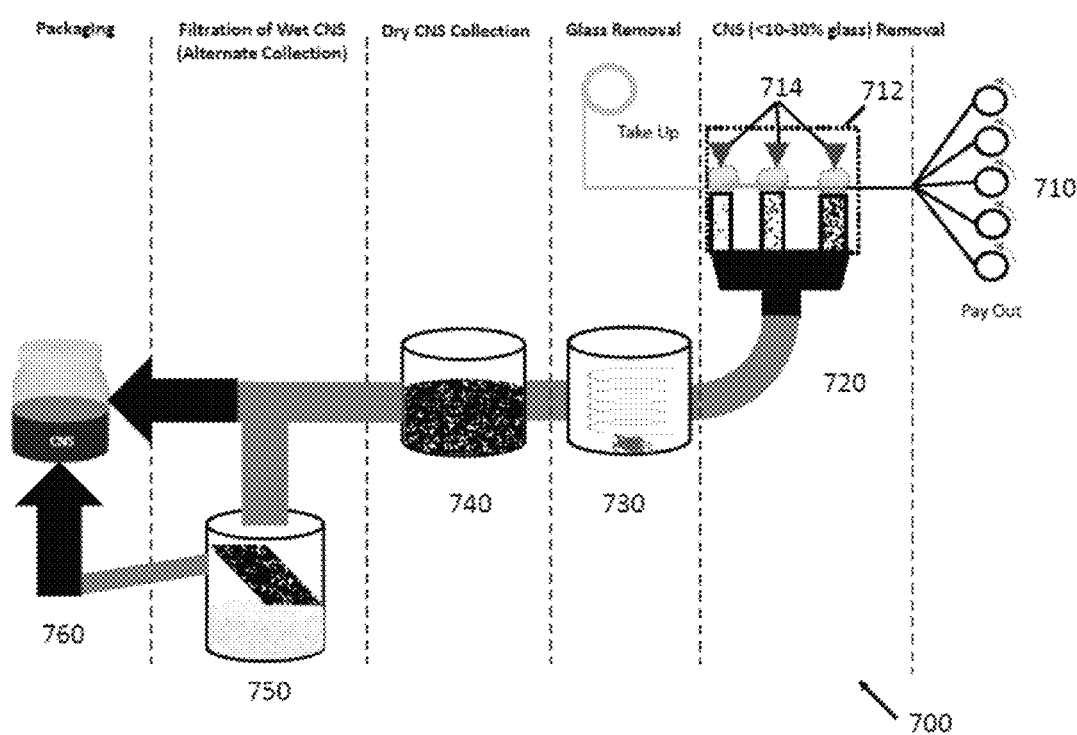
FIG. 9 shows an illustrative schematic further elaborating on the process demonstrated in FIG. 8.

FIG. 9 shows an illustrative schematic further elaborating on the process demonstrated in FIG. 8. As illustrated in process 700 of FIG. 9, a single spool or multiple spools of a carbon nanostructure-laden fiber-type substrate is fed in operation 710 to removal chamber 712 using a pay-out and take-up system. Removal of the carbon nanostructures from the fiber-type substrate can be affected with a single or several pressurized air source tools 714, such as an air knife or air nozzle at operation 720. Such air source tools can be placed generally perpendicular to the spool(s), and the air can then be directed on to the fiber-type substrate carrying the carbon nanostructures. In some embodiments, the air source tool can be stationary, while in other embodiments, the air source tool can be movable. In embodiments where the air source tool is movable, it can be configured to oscillate with respect to the surface of the fiber-type substrate to improve the removal efficiency. Upon air impact, fiber tows and other bundled fiber-type substrates can be spread, thereby exposing additional surface area on the substrate and improving removal of the carbon nanostructures, while advantageously avoiding mechanical contact. In some embodiments, the integrity of the substrate can be sufficient to recycle the substrate in a continuous cycle of carbon nanostructure synthesis and removal. Thus, in some embodiments, the substrate can be in the form of a belt or a loop in which carbon nanostructures are synthesized on the substrate, subsequently removed downstream, and then recycled for additional growth of new carbon nanostructures in the location where the original carbon nanostructures were removed. In some embodiments, removal of the original carbon nanostructures can result in removal of the surface treatment that facilitated carbon nanostructure removal. Thus, in some embodiments, the substrate can again be modified after removal of the original carbon nanostructures to promote removal of the new carbon nanostructures, as generally performed according to the surface modification techniques described herein. The surface treatment performed on the substrate after the original carbon nanostructures are removed can be the same or different as the original surface treatment.

In some embodiments, the integrity of the substrate can be compromised during carbon nanostructure removal, and at least a portion of the substrate can become admixed with the carbon nanostructures while no longer being adhered thereto. Referring still to FIG. 9, fragmented substrate that has become admixed with the isolated carbon nanostructures can be removed in operation 730. In FIG. 9, operation 730 is depicted as taking place by cyclonic filtration, but any suitable solids separation technique can be used. For example, in some embodiments, sieving, differential settling, or other size-based separations can be performed. In other embodiments, density-based separations can be performed. In still other embodiments, a chemical reaction may be used, at least in part, to affect separation of the carbon nanostructures from growth substrate that is not adhered to the carbon nanostructures. Although FIG. 9 has depicted a single cyclonic filtration, multiple vacuum and cyclonic filtration techniques can be used in series, parallel, or any combination thereof to remove residual fragmented growth substrate from the carbon nanostructures. Such techniques can employ multiple stages of filter media and/or filtration rates to selectively capture the fragmented growth substrate while allowing the carbon nanostructures to pass to a collection vessel. The resultant carbon nanostructures can be either collected dry at operation 740 or collected as a wet sludge at operation 750. In some embodiments, the carbon nanostructures can be processed directly following the removal of fragmented growth substrate in operation 730 and packed into a storage vessel or shippable container in packaging operation 760. Otherwise, packaging can follow dry collection operation 740 or wet collection operation 750.

In embodiments where wet processing is employed, the carbon nanostructures can be mixed with and captured in a solution containing about 1% to about 40% solvent in water and passed through a filter or like separation mechanism to separate the carbon nanostructure from the water/solvent solution. The resultant separated carbon nanostructures can be dried and packed or stored "wet" as a dispersion in a fluid phase. It has been observed that unlike individualized carbon nanotube solutions or dispersions, carbon nanostructures can advantageously form stable dispersions. In some embodiments, stable dispersions can be achieved in the absence of stabilizing surfactants, even with water as solvent. In some or other embodiments, a solvent can be used in combination with water during wet processing. Suitable solvents for use in conjunction with wet processing can include, but are not limited to, isopropanol (IPA), ethanol, methanol, and water.

Figure 10:
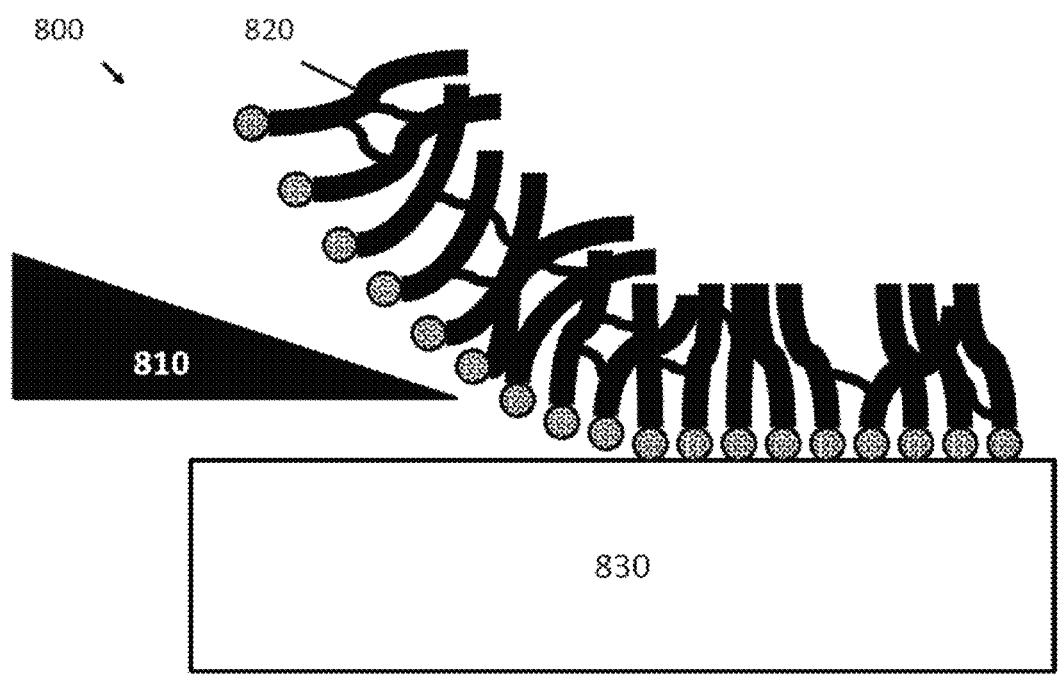
FIG. 10 shows an illustrative schematic demonstrating how mechanical shearing can be used to remove carbon nanostructures and a transition metal nanoparticle catalyst from a growth substrate.

In various embodiments, the CNS described herein can be removed from the growth substrate in intact form by a shearing action imparted on the CNS by directed and focused fluid media or mechanical contact. As an alternative to fluid shearing, mechanical shearing can be used to remove the carbon nanostructure from the growth substrate in some embodiments. FIG. 10 shows an illustrative schematic demonstrating how mechanical shearing can be used to remove a carbon nanostructure and a transition metal nanoparticle catalyst from a growth substrate. As shown in FIG. 10, carbon nanostructure removal process 800 can employ mechanical shearing force 810 to remove both the carbon nanostructure and the transition metal nanoparticle catalyst from growth substrate 830 as monolithic entity 820. In some such embodiments, sizing and/or additional anti-adhesive coatings can be employed to limit carbon nanostructure and/or nanoparticle adhesion to the growth substrate, thereby allowing mechanical shear or another type of shearing force to facilitate removal of the carbon nanostructure from the growth substrate. In some embodiments, mechanical shear can be provided by grinding the carbon nanostructure-infused fiber with dry ice.

As another alternative to fluid shearing, in some embodiments, sonication can be used to remove the carbon nanostructures from the growth substrate.

Figure 11:
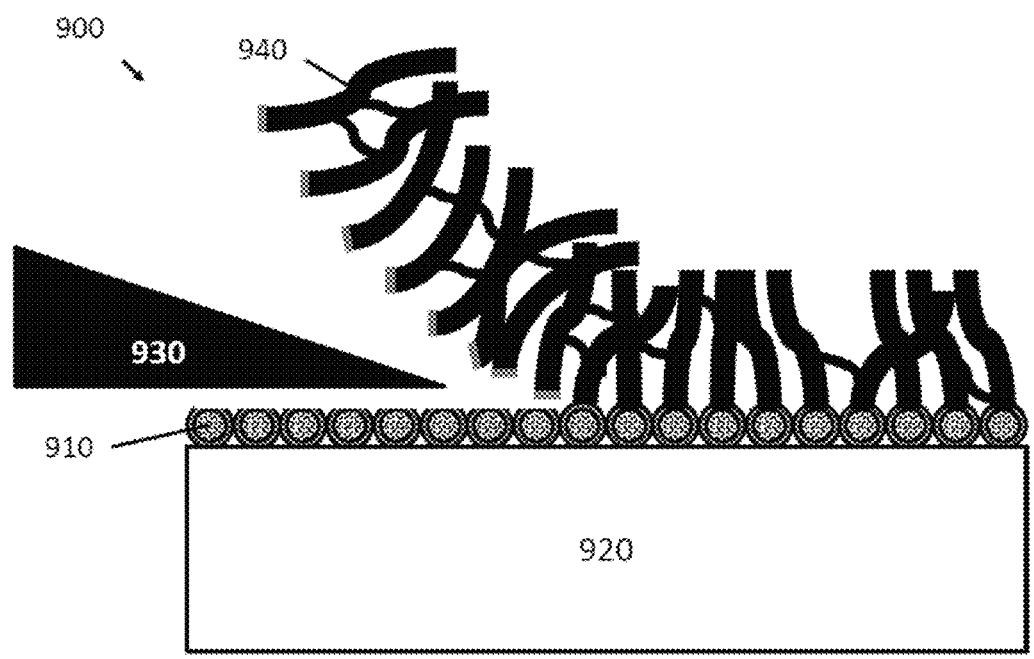
FIG. 11 shows an illustrative schematic demonstrating a carbon nanostructure removal process in which carbon nanostructures can be isolated from a growth substrate absent a transition metal nanoparticle catalyst.

In some embodiments, the carbon nanostructures can be removed from the growth substrate without substantially removing the transition metal nanoparticle catalyst. FIG. 11 shows an illustrative schematic demonstrating carbon nanostructure removal process 900 in which a carbon nanostructure can be isolated from a growth substrate absent a transition metal nanoparticle catalyst. As shown in FIG. 11, carbon nanostructure 940 can be grown on growth substrate 920 using implanted transition metal nanoparticle catalyst 910. Thereafter, shear removal 930 of carbon nanostructure 940 leaves transition metal nanoparticle catalyst 910 behind on growth substrate 920. In some such embodiments, a layered catalyst can promote adhesion to the substrate surface, while decreasing carbon nanostructure to nanoparticle adhesion.

Although FIGS. 10 and 11 have depicted carbon nanostructure growth as taking place with basal growth from the catalyst, the skilled artisan will recognize that other mechanistic forms of carbon nanostructure growth are possible. For example, carbon nanostructure growth can also take place such that the catalyst resides distal to the growth substrate on the surface of the carbon nanostructure (i.e., tip growth) or somewhere between tip growth and basal growth. In some embodiments, predominantly basal growth can be selected to aid in carbon nanostructure removal from the growth substrate.

In alternative embodiments, removal of the carbon nanostructures from the growth substrate can take place by a process other than fluid shearing or mechanical shearing. In some embodiments, chemical etching can be used to remove the carbon nanostructures from the growth substrate. In some embodiments, the transition metal nanoparticle catalyst used to promote carbon nanostructure growth can be a transition metal salt containing an anion that is selected to etch the growth substrate, thereby facilitating removal of the carbon nanostructures. Suitable etching anions can include, for example, chlorides, sulfates, nitrates, nitrites, and fluorides. In some or other embodiments, a chemical etch can be employed independently from the catalyst choice. For example, when employing a glass substrate, a hydrogen fluoride etch can be used to weaken adherence of the carbon nanostructures and/or the transition metal nanoparticle catalyst to the substrate.

The carbon nanostructures disclosed herein comprise carbon nanotubes (CNTs) in a network having a complex structural morphology, which has been described in more detail hereinabove. Without being bound by any theory or mechanism, it is believed that this complex structural morphology results from the preparation of the carbon nanostructures on a substrate under CNT growth conditions that produce a rapid growth rate on the order of several microns per second. The rapid CNT growth rate, coupled with the close proximity of the CNTs to one another, can confer the observed branching, crosslinking, and shared wall motifs to the CNTs. In the discussion that follows, techniques for producing carbon nanostructures bound to a fiber substrate are described. For simplicity, the discussion may refer to carbon nanostructures disposed on the substrate interchangeably as CNTs, since CNTs represent the major structural component of carbon nanostructures.

In some embodiments, the processes disclosed herein can be applied to nascent fiber materials generated de novo before, or in lieu of, application of a typical sizing solution to the fiber material. Alternatively, the processes disclosed herein can utilize a commercial fiber material, for example, a tow, that already has a sizing applied to its surface. In such embodiments, the sizing can be removed to provide a direct interface between the fiber material and the synthesized carbon nanostructure, although a transition metal nanoparticle catalyst can serve as an intermediate linker between the two. After carbon nanostructure synthesis, further sizing agents can be applied to the fiber material as desired. For the purpose of carbon nanostructure isolation, any of the above mentioned sizing or coatings can be employed to facilitate the isolation process. Equally suitable substrates for forming a carbon nanostructure include tapes, sheets and even three dimensional forms which can be used to provide a shaped carbon nanostructure product. The processes described herein allow for the continuous production of CNTs that make up the carbon nanostructure network having uniform length and distribution along spoolable lengths of tow, tapes, fabrics and other 3D woven structures.

As used herein the term "fiber material" refers to any material which has fiber as its elementary structural component. The term encompasses fibers, filaments, yarns, tows, tows, tapes, woven and non-woven fabrics, plies, mats, and the like.

As used herein the term "spoolable dimensions" refers to fiber materials having at least one dimension that is not limited in length, allowing for the material to be stored on a spool or mandrel. Processes of described herein can operate readily with 5 to 20 lb. spools, although larger spools are usable. Moreover, a pre-process operation can be incorporated that divides very large spoolable lengths, for example 100 lb. or more, into easy to handle dimensions, such as two 50 lb. spools.

As used herein, the term "carbon nanotube" (CNT, plural CNTs) refers to any of a number of cylindrically-shaped allotropes of carbon of the fullerene family including single-walled carbon nanotubes (SWNTs), double-walled carbon nanotubes (DWNTs), multi-walled carbon nanotubes (MWNTs). CNTs can be capped by a fullerene-like structure or open-ended. CNTs include those that encapsulate other materials. CNTs can appear in branched networks, entangled networks, and combinations thereof. The CNTs prepared on the substrate within the carbon nanostructure can include individual CNT motifs from exclusive MWNTs, SWNTs, or DWNTs, or the carbon nanostructure can include mixtures of CNT these motifs.

As used herein "uniform in length" refers to an average length of CNTs grown in a reactor for producing a carbon nanostructure. "Uniform length" means that the CNTs have lengths with tolerances of plus or minus about 20% of the total CNT length or less, for CNT lengths varying from between about 1 micron to about 500 microns. At very short lengths, such as 1-4 microns, this error may be in a range from between about plus or minus 20% of the total CNT length up to about plus or minus 1 micron, that is, somewhat more than about 20% of the total CNT length. In the context of the carbon nanostructure, at least one dimension of the carbon nanostructure can be controlled by the length of the CNTs grown.

As used herein "uniform in distribution" refers to the consistency of density of CNTs on a growth substrate, such as a fiber material. "Uniform distribution" means that the CNTs have a density on the fiber material with tolerances of plus or minus about 10% coverage defined as the percentage of the surface area of the fiber covered by CNTs. This is equivalent to $\pm 1500$ CNTs/$\mu m^2$ for an 8 nm diameter CNT with 5 walls. Such a figure assumes the space inside the CNTs as Tillable.

As used herein, the term "transition metal" refers to any element or alloy of elements in the d-block of the periodic table. The term "transition metal" also includes salt forms of the base transition metal element such as oxides, carbides, nitrides, and the like.

As used herein, the term "nanoparticle" or NP (plural NPs), or grammatical equivalents thereof refers to particles sized between about 0.1 to about 100 nanometers in equivalent spherical diameter, although the NPs need not be spherical in shape. Transition metal NPs, in particular, can serve as catalysts for CNT growth on the fiber materials.

As used herein, the term "sizing agent," "fiber sizing agent," or just "sizing," refers collectively to materials used in the manufacture of fibers as a coating to protect the integrity of fibers, provide enhanced interfacial interactions between a fiber and a matrix material in a composite, and/or alter and/or enhance particular physical properties of a fiber.

As used herein, the term "material residence time" refers to the amount of time a discrete point along a fiber material of spoolable dimensions is exposed to CNT growth conditions during the CNS processes described herein. This definition includes the residence time when employing multiple CNT growth chambers.

As used herein, the term "linespeed" refers to the speed at which a fiber material of spoolable dimensions is fed through the CNT synthesis processes described herein, where linespeed is a velocity determined by dividing CNT chamber(s)' length by the material residence time.

In some embodiments, the CNT-laden fiber material includes a fiber material of spoolable dimensions and carbon nanotubes (CNTs) in the form of a carbon nanostructure grown on the fiber material.

Without being bound by any theory or mechanism, transition metal NPs, which serve as a CNT-forming catalyst, can catalyze CNT growth by forming a CNT growth seed structure. In one embodiment, the CNT-forming catalyst can remain at the base of the fiber material (i.e., basal growth). In such a case, the seed structure initially formed by the transition metal nanoparticle catalyst is sufficient for continued non-catalyzed seeded CNT growth without allowing the catalyst to move along the leading edge of CNT growth (i.e., tip growth). In such a case, the NP serves as a point of attachment for the CNS to the fiber material.

Compositions having CNS-laden fiber materials are provided in which the CNTs are substantially uniform in length. In the continuous process described herein, the residence time of the fiber material in a CNT growth chamber can be modulated to control CNT growth and ultimately, CNT and CNS length. These features provide a means to control specific properties of the CNTs grown and hence the properties of the CNS. CNT length can also be controlled through modulation of the carbon feedstock and carrier gas flow rates and reaction temperature. Additional control of the CNT properties can be obtained by modulating, for example, the size of the catalyst used to prepare the CNTs. For example, 1 nm transition metal nanoparticle catalysts can be used to provide SWNTs in particular. Larger catalysts can be used to prepare predominantly MWNTs.

Additionally, the CNT growth processes employed are useful for providing a CNS-laden fiber material with uniformly distributed CNTs while avoiding bundling and/or aggregation of the CNTs that can occur in processes in which pre-formed CNTs are suspended or dispersed in a solvent medium and applied by hand to the fiber material. In some embodiments, the maximum distribution density, expressed as percent coverage, that is, the surface area of fiber material that is covered, can be as high as about 55% assuming about 8 nm diameter CNTs with 5 walls. This coverage is calculated by considering the space inside the CNTs as being "fillable" space. Various distribution/density values can be achieved by varying catalyst dispersion on the surface as well as controlling gas composition and process speed. Typically for a given set of parameters, a percent coverage within about 10% can be achieved across a fiber surface. Higher density and shorter CNTs (e.g., less than about 100 microns in length) can be useful for improving mechanical properties, while longer CNTs (e.g., greater than about 100 microns in length) with lower density can be useful for improving thermal and electrical properties, although increased density still can be favorable. A lower density can result when longer CNTs are grown. This can be the result of the higher temperatures and more rapid growth causing lower catalyst particle yields.

CNS-laden fiber materials can include a fiber material such as filaments, a fiber yarn, a fiber tow, a fiber-braid, a woven fabric, a non-woven fiber mat, a fiber ply, and other 3D woven structures. Filaments include high aspect ratio fibers having diameters ranging in size from between about 1 micron to about 100 microns. Fiber tows are generally compactly associated bundles of filaments and are usually twisted together to give yarns.

Yarns include closely associated bundles of twisted filaments. Each filament diameter in a yarn is relatively uniform. Yarns have varying weights described by their 'tex,' expressed as weight in grams of 1000 linear meters, or denier, expressed as weight in pounds of 10,000 yards, with a typical tex range usually being between about 200 tex to about 2000 tex.

Tows include loosely associated bundles of untwisted filaments. As in yarns, filament diameter in a tow is generally uniform. Tows also have varying weights and the tex range is usually between 200 tex and 2000 tex. They are frequently characterized by the number of thousands of filaments in the tow, for example 12K tow, 24K tow, 48K tow, and the like.

Tapes are materials that can be assembled as weaves or can represent non-woven flattened tows. Tapes can vary in width and are generally two-sided structures similar to ribbon. CNT infusion can take place on one or both sides of a tape. CNS-laden tapes can resemble a "carpet" or "forest" on a flat substrate surface. However, the CNS can be readily distinguished from conventional aligned CNT forests due to the significantly higher degree of branching and crosslinking that occurs in the CNS structural morphology. Again, processes described herein can be performed in a continuous mode to functionalize spools of tape.

Fiber braids represent rope-like structures of densely packed fibers. Such structures can be assembled from yarns, for example. Braided structures can include a hollow portion or a braided structure can be assembled about another core material.

CNTs lend their characteristic properties such as mechanical strength, low to moderate electrical resistivity, high thermal conductivity, and the like to the CNS-laden fiber material. For example, in some embodiments, the electrical resistivity of a carbon nanotube-laden fiber material is lower than the electrical resistivity of a parent fiber material. Likewise, such properties can translate to the isolated CNS. More generally, the extent to which the resulting CNS-laden fiber expresses these characteristics can be a function of the extent and density of coverage of the fiber by the carbon nanotubes. Any amount of the fiber surface area, from 0-55% of the fiber can be covered assuming an 8 nm diameter, 5-walled MWNT (again this calculation counts the space inside the CNTs as fillable). This number is lower for smaller diameter CNTs and more for greater diameter CNTs. 55% surface area coverage is equivalent to about 15,000 CNTs/micron$^2$. Further CNT properties can be imparted to the fiber material in a manner dependent on CNT length, as described above. CNTs within the carbon nanostructure can vary in length from between about 1 micron to about 500 microns, including about 1 micron, about 2 microns, about 3 microns, about 4 micron, about 5, microns, about 6, microns, about 7 microns, about 8 microns, about 9 microns, about 10 microns, about 15 microns, about 20 microns, about 25 microns, about 30 microns, about 35 microns, about 40 microns, about 45 microns, about 50 microns, about 60 microns, about 70 microns, about 80 microns, about 90 microns, about 100 microns, about 150 microns, about 200 microns, about 250 microns, about 300 microns, about 350 microns, about 400 microns, about 450 microns, about 500 microns, and all values and sub-ranges in between. CNTs can also be less than about 1 micron in length, including about 0.5 microns, for example. CNTs can also be greater than 500 microns, including for example, about 510 microns, about 520 microns, about 550 microns, about 600 microns, about 700 microns and all values and subranges in between. It will be understood that such lengths accommodate the presence of crosslinking and branching and therefore the length may be the composite length measured from the base of the growth substrate up to the edges of the CNS.

CNSs described herein can also incorporate CNTs have a length from about 1 micron to about 10 microns. Such CNT lengths can be useful in application to increase shear strength. CNTs can also have a length from about 5 to about 70 microns. Such CNT lengths can be useful in applications for increased tensile strength if the CNTs are aligned in the fiber direction. CNTs can also have a length from about 10 microns to about 100 microns. Such CNT lengths can be useful to increase electrical/thermal properties as well as mechanical properties. CNTs having a length from about 100 microns to about 500 microns can also be beneficial to increase electrical and thermal properties. Such control of CNT length is readily achieved through modulation of carbon feedstock and inert gas flow rates coupled with varying linespeeds and growth temperatures.

In some embodiments, compositions that include spoolable lengths of CNS-laden fiber materials can have various uniform regions with different lengths of CNTs. For example, it can be desirable to have a first portion of CNS-laden fiber material with uniformly shorter CNT lengths to enhance shear strength properties, and a second portion of the same spoolable material with a uniform longer CNT length to enhance electrical or thermal properties.

Processes for rapid CNS growth on fiber materials allow for control of the CNT lengths with uniformity in continuous processes with spoolable fiber materials. With material residence times between 5 to 300 seconds, linespeeds in a continuous process for a system that is 3 feet long can be in a range anywhere from about 0.5 ft/min to about 36 ft/min and greater. The speed selected depends on various parameters as explained further below.

In some embodiments, a material residence time of about 5 seconds to about 30 seconds can produce CNTs having a length between about 1 micron to about 10 microns. In some embodiments, a material residence time of about 30 seconds to about 180 seconds can produce CNTs having a length between about 10 microns to about 100 microns. In still further embodiments, a material residence time of about 180 seconds to about 300 seconds can produce CNTs having a length between about 100 microns to about 500 microns. One skilled in the art will recognize that these ranges are approximate and that CNT length can also be modulated by reaction temperatures, and carrier and carbon feedstock concentrations and flow rates.

In some embodiments, continuous processes for CNS growth can include (a) disposing a carbon nanotube-forming catalyst on a surface of a fiber material of spoolable dimensions; and (b) synthesizing carbon nanotubes directly on the fiber material, thereby forming a CNS-laden fiber material. For a 9 foot long system, the linespeed of the process can range from between about 1.5 ft/min to about 108 ft/min. The linespeeds achieved by the process described herein allow the formation of commercially relevant quantities of CNS-laden fiber materials with short production times. For example, at 36 ft/min linespeed, the quantities of CNS-laden fibers (over 5% CNTs on fiber by weight) can exceed over 100 pound or more of material produced per day in a system that is designed to simultaneously process 5 separate tows (20 lb/tow). Systems can be made to produce more tows at once or at faster speeds by repeating growth zones.

As described further below the catalyst can be prepared as a liquid solution that contains CNT-forming catalyst that contains transition metal nanoparticles. The diameters of the synthesized nanotubes are related to the size of the transition metal nanoparticles as described above. In some embodiments, commercial dispersions of CNT-forming transition metal nanoparticle catalysts are available and can be used without dilution, and in other embodiments commercial dispersions of catalyst can be diluted. Whether to dilute such solutions can depend on the desired density and length of CNT to be grown as described above.

Carbon nanotube synthesis can be based on a chemical vapor deposition (CVD) process and occurs at elevated temperatures. The specific temperature is a function of catalyst choice, but will typically be in a range of about 500° C. to about 1000° C. This operation involves heating the fiber material to a temperature in the aforementioned range to support carbon nanotube synthesis.

CVD-promoted nanotube growth on the catalyst-laden fiber material is then performed. The CVD process can be promoted by, for example, a carbon-containing feedstock gas such as acetylene, ethylene, methane, and/or propane. The CNT synthesis processes generally use an inert gas (nitrogen, argon, helium) as a primary carrier gas. The carbon feedstock is generally provided in a range from between about 0% to about 50% of the total mixture. A substantially inert environment for CVD growth is prepared by removal of moisture and oxygen from the growth chamber.

The operation of disposing a catalyst on the fiber material can be accomplished by spraying or dip coating a solution or by gas phase deposition via, for example, a plasma process. Thus, in some embodiments, after forming a solution of a catalyst in a solvent, catalyst can be applied by spraying or dip coating the fiber material with the solution, or combinations of spraying and dip coating. Either technique, used alone or in combination, can be employed once, twice, thrice, four times, up to any number of times to provide a fiber material that is sufficiently uniformly coated with CNT-forming catalyst. When dip coating is employed, for example, a fiber material can be placed in a first dip bath for a first residence time in the first dip bath. When employing a second dip bath, the fiber material can be placed in the second dip bath for a second residence time. For example, fiber materials can be subjected to a solution of CNT-forming catalyst for between about 3 seconds to about 90 seconds depending on the dip configuration and linespeed. Employing spraying or dip coating processes, a fiber material with a surface density of catalyst of less than about 5% surface coverage to as high as about 80% coverage, in which the CNT-forming catalyst nanoparticles are nearly monolayer. In some embodiments, the process of coating the CNT-forming catalyst on the fiber material should produce no more than a monolayer. For example, CNT growth on a stack of CNT-forming catalyst can erode the degree of infusion of the CNT to the fiber material. In other embodiments, the transition metal catalyst can be deposited on the fiber material using evaporation techniques, electrolytic deposition techniques, and other deposition processes, such as addition of the transition metal catalyst to a plasma feedstock gas as a metal organic, metal salt or other composition promoting gas phase transport.

Because processes for growing carbon nanostructures are designed to be continuous, a spoolable fiber material can be dip-coated in a series of baths where dip coating baths are spatially separated. In continuous processes in which nascent fibers are being generated de novo, dip bath or spraying of CNT-forming catalyst can be the first step. In other embodiments, the CNT-forming catalyst can be applied to newly formed fibers in the presence of other sizing agents. Such simultaneous application of CNT-forming catalyst and other sizing agents can provide the CNT-forming catalyst in the surface of the sizing on the fiber material to create a poorly adhered CNT coating.

The catalyst solution employed can be a transition metal nanoparticle which can be any d-block transition metal, as described above. In addition, the nanoparticles can include alloys and non-alloy mixtures of d-block metals in elemental form or in salt form, and mixtures thereof. Such salt forms include, without limitation, oxides, carbides, acetates, and nitrides. Non-limiting exemplary transition metal NPs include Ni, Fe, Co, Mo, Cu, Pt, Au, and Ag and salts thereof and mixtures thereof. In some embodiments, such CNT-forming catalysts are disposed on the fiber by applying or infusing a CNT-forming catalyst directly to the fiber material simultaneously with barrier coating deposition. Many of these transition metal catalysts are readily commercially available from a variety of suppliers, including, for example, Sigma Aldrich (St. Louis, Mo.) or Ferrotec Corporation (Bedford, N.H.).

Catalyst solutions used for applying the CNT-forming catalyst to the fiber material can be in any common solvent that allows the CNT-forming catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the CNT-forming catalyst nanoparticles. Concentrations of CNT-forming catalyst can be in a range from about 1:1 to 1:10000 catalyst to solvent. Such concentrations can be used when the barrier coating and CNT-forming catalyst are applied simultaneously as well.

In some embodiments heating of the fiber material can be at a temperature that is between about 500° C. and about 1000° C. to synthesize carbon nanotubes after deposition of the CNT-forming catalyst. Heating at these temperatures can be performed prior to or substantially simultaneously with introduction of a carbon feedstock for CNT growth.

In some embodiments, the processes for producing a carbon nanostructure include removing a sizing agent from a fiber material, applying an adhesion-inhibiting coating (i.e., an anti-adhesive coating) conformally over the fiber material, applying a CNT-forming catalyst to the fiber material, heating the fiber material to at least 500° C., and synthesizing carbon nanotubes on the fiber material. In some embodiments, operations of the CNS-growth process can include removing sizing from a fiber material, applying an adhesion-inhibiting coating to the fiber material, applying a CNT-forming catalyst to the fiber, heating the fiber to CNT-synthesis temperature and performing CVD-promoted CNS growth on the catalyst-laden fiber material. Thus, where commercial fiber materials are employed, processes for constructing CNS-laden fibers can include a discrete step of removing sizing from the fiber material before disposing adhesion-inhibiting coating and the catalyst on the fiber material.

Synthesizing carbon nanotubes on the fiber material can include numerous techniques for forming carbon nanotubes, including those disclosed in co-pending U.S. Patent Application Publication No. 2004/0245088, which is incorporated herein by reference. The CNS grown on the fibers can be formed by techniques such as, for example, micro-cavity, thermal or plasma-enhanced CVD techniques, laser ablation, arc discharge, and high pressure carbon monoxide (HiPCO). In some embodiments, any conventional sizing agents can be removed prior CNT synthesis. In some embodiments, acetylene gas can be ionized to create a jet of cold carbon plasma for CNT synthesis. The plasma is directed toward the catalyst-bearing fiber material. Thus, in some embodiments for synthesizing CNS on a fiber material include (a) forming a carbon plasma; and (b) directing the carbon plasma onto the catalyst disposed on the fiber material. The diameters of the CNTs that are grown are dictated by the size of the CNT-forming catalyst as described above. In some embodiments, the sized fiber material is heated to between about 550° C. to about 800° C. to facilitate CNS synthesis. To initiate the growth of CNTs, two gases are bled into the reactor: a process gas such as argon, helium, or nitrogen, and a carbon-containing gas, such as acetylene, ethylene, ethanol or methane. CNTs grow at the sites of the CNT-forming catalyst.

In some embodiments, the CVD growth is plasma-enhanced. A plasma can be generated by providing an electric field during the growth process. CNTs grown under these conditions can follow the direction of the electric field. Thus, by adjusting the geometry of the reactor, vertically aligned carbon nanotubes can be grown radially about a cylindrical fiber. In some embodiments, a plasma is not required for radial growth about the fiber. For fiber materials that have distinct sides such as tapes, mats, fabrics, plies, and the like, catalyst can be disposed on one or both sides and correspondingly, CNTs can be grown on one or both sides as well.

As described above, CNS-synthesis can be performed at a rate sufficient to provide a continuous process for functionalizing spoolable fiber materials. Numerous apparatus configurations facilitate such continuous synthesis and result in the complex CNS morphology, as exemplified below.

One configuration for continuous CNS synthesis involves an optimally shaped (shaped to match the size and shape of the substrate) reactor for the synthesis and growth of carbon nanotubes directly on fiber materials. The reactor can be designed for use in a continuous in-line process for producing CNS-bearing fibers. In some embodiments, CNSs can be grown via a chemical vapor deposition ("CVD") process at atmospheric pressure and at elevated temperature in the range of about 550° C. to about 800° C. in a multi-zone reactor. The fact that the synthesis occurs at atmospheric pressure is one factor that facilitates the incorporation of the reactor into a continuous processing line for CNS-on-fiber synthesis. Another advantage consistent with in-line continuous processing using such a zoned reactor is that CNT growth occurs in a seconds, as opposed to minutes (or longer) as in other procedures and apparatus configurations typical in the art.

CNS synthesis reactors in accordance with the various embodiments include the following features:

Optimally Shaped Synthesis Reactors: Adjusting the size of the growth chamber to more effectively match the size of the substrate traveling through it improves reaction rates as well as process efficiency by reducing the overall volume of the reaction vessel. The cross section of the optimally shaped growth chamber can be maintained below a volume ratio of chamber to substrate of 10,000. In some embodiments, the cross section of the chamber is maintained at a volume ratio of below 1,000. In other embodiments, the cross section of the chamber is maintained at a volume ratio below 500.

Although gas deposition processes, such as CVD, are typically governed by pressure and temperature alone, volume has a significant impact on the efficiency of deposition. By matching the shape of the substrate with the growth chamber there is greater opportunity for productive CNS forming reactions to occur. It should be appreciated that in some embodiments, the synthesis reactor has a cross section that is described by polygonal forms according the shape of the substrate upon which the CNS is grown to provide a reduction in reactor volume. In some embodiments, gas can be introduced at the center of the reactor or within a target growth zone, symmetrically, either through the sides or through the top and bottom plates of the reactor. This improves the overall CNT growth rate because the incoming feedstock gas is continuously replenishing at the hottest portion of the system, which is where CNT growth is most active. This constant gas replenishment is an important aspect to the increased growth rate exhibited by the shaped CNT reactors.

Zoning: Chambers that provide a relatively cool purge zone depend from both ends of the synthesis reactor. Applicants have determined that if hot gas were to mix with the external environment (i.e., outside of the reactor), there would be an increase in degradation of most fiber materials. The cool purge zones provide a buffer between the internal system and external environments. Typical CNT synthesis reactor configurations known in the art typically require that the substrate is carefully (and slowly) cooled. The cool purge zone at the exit of the present CNS growth reactor achieves the cooling in a short period of time, as required for the continuous in-line processing.

Non-contact, hot-walled, metallic reactor: In some embodiments, a hot-walled reactor made of metal can be employed, in particular stainless steel. This may appear counterintuitive because metal, and stainless steel in particular, is more susceptible to carbon deposition (i.e., soot and by-product formation). Thus, most CNT reactor configurations use quartz reactors because there is less carbon deposited, quartz is easier to clean, and quartz facilitates sample observation.

However, it has been observed that the increased soot and carbon deposition on stainless steel results in more consistent, faster, more efficient, and more stable CNT growth. Without being bound by theory it has been indicated that, in conjunction with atmospheric operation, the CVD process occurring in the reactor is diffusion limited. That is, the catalyst is "overfed;" too much carbon is available in the reactor system due to its relatively higher partial pressure (than if the reactor was operating under partial vacuum). As a consequence, in an open system—especially a clean one—too much carbon can adhere to catalyst particles, compromising their ability to synthesize CNTs. In some embodiments, the rectangular reactor is intentionally run when the reactor is "dirty," that is with soot deposited on the metallic reactor walls. Once carbon deposits to a monolayer on the walls of the reactor, carbon will readily deposit over itself. Since some of the available carbon is "withdrawn" due to this mechanism, the remaining carbon feedstock, in the form of radicals, react with the catalyst at a rate that does not poison the catalyst. Existing systems run "cleanly" which, if they were open for continuous processing, would produce a much lower yield of CNTs at reduced growth rates.

Although it is generally beneficial to perform CNT synthesis "dirty" as described above, certain portions of the apparatus, such as gas manifolds and inlets, can nonetheless negatively impact the CNT growth process when soot created blockages. In order to combat this problem, such areas of the CNT growth reaction chamber can be protected with soot inhibiting coatings such as silica, alumina, or MgO. In practice, these portions of the apparatus can be dip-coated in these soot inhibiting coatings. Metals such as INVAR® can be used with these coatings as INVAR has a similar CTE (coefficient of thermal expansion) ensuring proper adhesion of the coating at higher temperatures, preventing the soot from significantly building up in critical zones.

In some embodiments, the reaction chamber may comprise SiC, alumina, or quartz as the primary chamber materials because they do not react with the reactive gases of CNS synthesis. This feature allows for increased efficiency and improves operability over long durations of operation.

Combined Catalyst Reduction and CNS Synthesis. In the CNT synthesis reactor, both catalyst reduction and CNS growth can occur within the reactor. This feature is significant because the reduction operation cannot be accomplished timely enough for use in a continuous process if performed as a discrete operation. In typical carbon nanotube synthesis processes, catalyst reduction typically takes 1-12 hours to perform. In synthesizing a carbon nanostructure according to the embodiments described herein, both catalyst reduction and CNS synthesis occur in the reactor, at least in part, due to the fact that carbon feedstock gas is introduced at the center of the reactor, not the end as would typically be performed using cylindrical reactors. The reduction process occurs as the fibers enter the heated zone; by this point, the gas has had time to react with the walls and cool off prior to reacting with the catalyst and causing the oxidation-reduction (via hydrogen radical interactions). It is this transition region where the reduction occurs. At the hottest isothermal zone in the system, the CNS growth occurs, with the greatest growth rate occurring proximal to the gas inlets near the center of the reactor.

In some embodiments, when loosely affiliated fiber materials, such as tow are employed, the continuous process can include operations that spreads out the strands and/or filaments of the tow. Thus, as a tow is unspooled it can be spread using a vacuum-based fiber spreading system, for example. When employing sized fibers, which can be relatively stiff, additional heating can be employed in order to "soften" the tow to facilitate fiber spreading. The spread fibers which comprise individual filaments can be spread apart sufficiently to expose an entire surface area of the filaments, thus allowing the tow to more efficiently react in subsequent process steps. Such spreading can approach between about 4 inches to about 6 inches across for a 3 k tow. The spread tow can pass through a surface treatment step that is composed of a plasma system as described above. After a barrier coating is applied and roughened, spread fibers then can pass through a CNT-forming catalyst dip bath. The result is fibers of the tow that have catalyst particles distributed radially on their surface. The catalyzed-laden fibers of the tow then enter an appropriate CNT growth chamber, such as the optimally shaped chamber described above, where a flow through atmospheric pressure CVD or PE-CVD process is used to synthesize the CNS at rates as high as several microns per second. The fibers of the tow, now with radially aligned CNTs in the form of the CNS morphology, exit the CNT growth reactor.

In some embodiments, CNS-laden fiber materials can pass through yet another treatment process prior to isolation that, in some embodiments is a plasma process used to functionalize the CNS. Additional functionalization of CNS can be used to promote their adhesion to particular resins. Thus, in some embodiments, the processes can provide CNS-laden fiber materials having functionalized CNS. Completing this functionalization process while the CNS are still on the fiber can improve treatment uniformity.

In some embodiments, a continuous process for growing of CNS on spoolable fiber materials can achieve a linespeed between about 0.5 ft/min to about 36 ft/min. In this embodiment where the CNT growth chamber is 3 feet long and operating at a 750° C. growth temperature, the process can be run with a linespeed of about 6 ft/min to about 36 ft/min to produce, for example, CNTs having a length between about 1 micron to about 10 microns. The process can also be run with a linespeed of about 1 ft/min to about 6 ft/min to produce, for example, CNTs having a length between about 10 microns to about 100 microns. The process can be run with a linespeed of about 0.5 ft/min to about 1 ft/min to produce, for example, CNTs having a length between about 100 microns to about 200 microns. The CNT length is not tied only to linespeed and growth temperature, however, the flow rate of both the carbon feedstock and the inert carrier gases can also influence CNT length. For example, a flow rate consisting of less than 1% carbon feedstock in inert gas at high linespeeds (6 ft/min to 36 ft/min) will result in CNTs having a length between 1 micron to about 5 microns. A flow rate consisting of more than 1% carbon feedstock in inert gas at high linespeeds (6 ft/min to 36 ft/min) will result in CNTs having length between 5 microns to about 10 microns.

In some embodiments, more than one material can be run simultaneously through the process. For example, multiple tapes tows, filaments, strand and the like can be run through the process in parallel. Thus, any number of pre-fabricated spools of fiber material can be run in parallel through the process and re-spooled at the end of the process. The number of spooled fiber materials that can be run in parallel can include one, two, three, four, five, six, up to any number that can be accommodated by the width of the CNT-growth reaction chamber. Moreover, when multiple fiber materials are run through the process, the number of collection spools can be less than the number of spools at the start of the process. In such embodiments, strands, tows, or the like can be sent through a further process of combining such fiber materials into higher ordered fiber materials such as woven fabrics or the like. The continuous process can also incorporate a post processing chopper that facilitates the formation CNS-laden chopped fiber mats, for example.

The continuous processing can optionally include further CNS chemistry. Because the CNS is a polymeric network of CNTs, all the chemistries associated with individualized CNTs may be carried out on the CNS materials. Such chemistries can be performed inline with CNS preparation or separately. In some embodiments, the CNS can be modified while it is still substrate-bound. This can aid in purification of the CNS material. In other embodiments, the CNS chemistry can be performed after it is removed from the substrate upon which it was synthesized. Exemplary chemistries include those described herein above in addition to fluorination, oxidation, reduction, and the like. In some embodiments, the CNS material can be used to store hydrogen. In some embodiments, the CNS structure can be modified by attachment to another polymeric structure to form a diblock polymer. In some embodiments, the CNS structure can be used as a platform for attachment of a biomolecule. In some embodiments, the CNS structure can be configured to be used as a sensor. In some embodiments, the CNS structure can be incorporated in a matrix material to form a composite material. In some embodiments, a CNS structure can be modified with reagents known to unzip CNTs and form graphene nanoribbons. Numerous other chemistries and downstream applications can be recognized by those skilled in the art.

In some embodiments, the processes allow for synthesizing a first amount of a first type of CNS on the fiber material, in which the first type of CNS comprises CNTs selected to alter at least one first property of the fiber material. Subsequently, the processes allow for synthesizing a second amount of a second type of CNS on the fiber material, in which the second type of CNS contains carbon nanotubes selected to alter at least one second property of the fiber material.

In some embodiments, the first amount and second amount of CNTs are different. This can be accompanied by a change in the CNT type or not. Thus, varying the density of CNS can be used to alter the properties of the original fiber material, even if the CNT type remains unchanged. CNT type can include CNT length and the number of walls, for example. In some embodiments the first amount and the second amount are the same. If different properties are desirable along two different stretches of the fiber material, then the CNT type can be changed, such as the CNT length. For example, longer CNTs can be useful in electrical/thermal applications, while shorter CNTs can be useful in mechanical strengthening applications.

Electrical conductivity or specific conductance is a measure of a material's ability to conduct an electric current. CNTs with particular structural parameters such as the degree of twist, which relates to CNT chirality, can be highly conducting, thus exhibiting metallic properties. A recognized system of nomenclature for CNT chirality has been formalized and is recognized by those skilled in the art. Thus, for example, CNTs are distinguished from each other by a double index (n,m) where n and m are integers that describe the cut and wrapping of hexagonal graphite so that it makes a tube when it is wrapped onto the surface of a cylinder and the edges are sealed together. When the two indices are the same, m=n, the resultant tube is said to be of the "arm-chair" (or n,n) type, since when the tube is cut perpendicular to the CNT axis only the sides of the hexagons are exposed and their pattern around the periphery of the tube edge resembles the arm and seat of an arm chair repeated n times. Arm-chair CNTs, in particular SWNTs, are metallic, and have extremely high electrical and thermal conductivity. In addition, such SWNTs have extremely high tensile strength.

In addition to the degree of twist, CNT diameter also effects electrical conductivity. As described above, CNT diameter can be controlled by use of controlled size CNT-forming catalyst nanoparticles. CNTs can also be formed as semi-conducting materials. Conductivity in multi-walled CNTs (MWNTs) can be more complex. Interwall reactions within MWNTs can redistribute current over individual tubes non-uniformly. By contrast, there is no change in current across different parts of metallic single-walled nanotubes (SWNTs). Carbon nanotubes also have very high thermal conductivity, comparable to diamond crystal and in-plane graphite sheets. Any of these characteristic properties of CNTs can be exhibited in a CNS. In some embodiments, the CNS can facilitate realization of property enhancements in materials in which the CNS is incorporated to a degree that is greater than that of individualized CNTs.

Although the invention has been described with reference to the disclosed embodiments, those skilled in the art will readily appreciate that these are only illustrative of the invention. It should be understood that various modifications can be made without departing from the spirit of the invention. The invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is the following:

1. A method for making a polymer composite, the method comprising:
   combining a plurality of carbon nanostructures and a polymer matrix, the carbon nanostructures each being free of an adhered growth substrate and comprising a plurality of carbon nanotubes that are branched, cross-linked, and share common walls with one another; and dispersing the carbon nanostructures in the polymer matrix under applied shear;
  wherein the applied shear breaks crosslinks between the carbon nanotubes to form a plurality of fractured carbon nanotubes that are dispersed as individuals in the polymer matrix;
  wherein the plurality of fractured carbon nanotubes comprises carbon nanotubes that are branched and share common walls with one another.

2. The method of claim 1, further comprising:
hardening the polymer matrix after dispersing the fractured carbon nanotubes as individuals therein.

3. The method of claim 1, wherein the carbon nanostructures are in the form of a carbon nanostructure flake material before being dispersed under the applied shear.

4. The method of claim 1, wherein a concentration of fractured carbon nanotubes in the polymer matrix ranges between about 0.1% to about 15% by weight of the polymer composite.

5. The method of claim 1, wherein a concentration of fractured carbon nanotubes in the polymer matrix ranges between about 3% to about 6% by weight of the polymer composite.

6. The method of claim 1, wherein at least a portion of the carbon nanostructures are functionalized before being dispersed under the applied shear.

7. The method of claim 1, wherein at least a portion of the carbon nanostructures further comprise an additive associated therewith, the additive becoming dispersed in the polymer matrix under the applied shear.

8. The method of claim 7, wherein the additive comprises a coating disposed on at least a portion of the carbon nanotubes of the carbon nanostructure.

9. The method of claim 8, wherein the coating remains on the fractured carbon nanotubes once they are dispersed as individuals in the polymer matrix.

10. The method of claim 1, wherein the carbon nanotubes in each carbon nanostructure are formed with branching, crosslinking, and sharing common walls during formation of the carbon nanotubes on a growth substrate.

11. The method of claim 1, further comprising:
incorporating a fiber material in the polymer matrix.

12. The method of claim 1, further comprising:
forming the carbon nanostructures on a growth substrate; and
removing the carbon nanostructures from the growth substrate prior to combining the carbon nanostructures with the polymer matrix.

13. The method of claim 12, wherein removing the carbon nanostructures from the growth substrate takes place by a technique selected from the group consisting of fluid shearing, mechanical shearing, chemical etching, sonication, and any combination thereof.

14. The method of claim 1, wherein the fractured carbon nanotubes are dispersed as individuals in the polymer matrix without a surfactant being present.

\* \* \* \* \*